US010669491B2

(12) United States Patent
McCarthy et al.

(10) Patent No.: US 10,669,491 B2
(45) Date of Patent: Jun. 2, 2020

(54) BASE METAL DEWAXING CATALYST

(71) Applicant: ExxonMobil Research and Engineering Company, Annandale, NJ (US)

(72) Inventors: Stephen J. McCarthy, Center Valley, PA (US); Chuansheng Bai, Phillipsburg, NJ (US); Wenyih Frank Lai, Bridgewater, NJ (US); Paul Podsiadlo, Easton, PA (US); William W. Lonergan, Humble, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 279 days.

(21) Appl. No.: 15/364,869

(22) Filed: Nov. 30, 2016

(65) Prior Publication Data

US 2017/0175011 A1 Jun. 22, 2017

Related U.S. Application Data

(60) Provisional application No. 62/270,213, filed on Dec. 21, 2015.

(51) Int. Cl.
*B01J 29/06* (2006.01)
*C10G 45/64* (2006.01)
*C10G 45/62* (2006.01)
*C10G 45/12* (2006.01)
*C10G 45/08* (2006.01)
*C10G 65/12* (2006.01)
*C10G 45/10* (2006.01)
*C10G 47/04* (2006.01)
*C10G 47/16* (2006.01)
*B01J 29/76* (2006.01)
*B01J 29/072* (2006.01)
*B01J 29/076* (2006.01)
*B01J 37/30* (2006.01)
*B01J 29/46* (2006.01)
*B01J 35/10* (2006.01)
*B01J 37/20* (2006.01)
*B01J 37/02* (2006.01)
(Continued)

(52) U.S. Cl.
CPC ............ *C10G 45/64* (2013.01); *B01J 29/061* (2013.01); *B01J 29/072* (2013.01); *B01J 29/076* (2013.01); *B01J 29/46* (2013.01); *B01J 29/48* (2013.01); *B01J 29/7661* (2013.01); *B01J 29/7861* (2013.01); *B01J 35/1004* (2013.01); *B01J 35/1009* (2013.01); *B01J 35/1014* (2013.01); *B01J 35/1019* (2013.01); *B01J 37/0009* (2013.01); *B01J 37/0203* (2013.01); *B01J 37/20* (2013.01); *B01J 37/30* (2013.01); *C10G 45/08* (2013.01); *C10G 45/10* (2013.01); *C10G 45/12* (2013.01); *C10G 45/62* (2013.01); *C10G 47/04* (2013.01); *C10G 47/16* (2013.01); *C10G 65/043* (2013.01); *C10G 65/12* (2013.01); *B01J 2229/186* (2013.01); *B01J 2229/20* (2013.01); *B01J 2229/42* (2013.01); *C10G 47/14* (2013.01); *C10G 2400/02* (2013.01); *C10G 2400/04* (2013.01); *C10G 2400/06* (2013.01); *C10G 2400/08* (2013.01); *C10G 2400/10* (2013.01)

(58) Field of Classification Search
CPC ...... B01J 29/061; B01J 29/072; B01J 29/076; B01J 29/46; B01J 29/48; B01J 29/7661; B01J 29/7861; B01J 2229/20; B01J 2229/42; B01J 2229/186; B01J 35/1019; B01J 35/1014; B01J 35/1009; B01J 35/1004; B01J 37/0009; B01J 37/0203; B01J 37/20; C10G 2400/10; C10G 2400/04
USPC ...................... 502/60, 64, 66, 69, 71, 74, 77
See application file for complete search history.

(56) References Cited

U.S. PATENT DOCUMENTS 3,354,078 A 11/1967 Miale et al.
4,872,968 A 10/1989 Bowes
(Continued)

FOREIGN PATENT DOCUMENTS

EP 0155822 A2 9/1985
EP 1880760 A1 1/2008
(Continued)

OTHER PUBLICATIONS

Weisz et al., "Superactive crystalline alunimosilicate hydrocarbon catalysts", Journal of Catalysis, Aug. 1965, pp. 527-529, vol. 4, iss. 4, ScienceDirect.

(Continued)

*Primary Examiner* — Elizabeth D Wood
(74) *Attorney, Agent, or Firm* — David M. Weisberg; Priya G. Prasad; Ryan L. Lobato

(57) ABSTRACT

Methods are provided for making base metal catalysts with improved activity. After forming catalyst particles based on a support comprising a zeolitic molecular sieve, the catalyst particles can be impregnated with a solution comprising a) metal salts (or other precursors) for a plurality of base metals and b) an organic dispersion agent comprising 2 to 10 carbons. The impregnated support particles can be dried to form a base metal catalyst, and then optionally sulfided to form a sulfided base metal catalyst. The resulting (sulfided) base metal catalyst can have improved activity for cloud point reduction and/or for improved activity for heteroatom removal, relative to a base metal dewaxing catalyst prepared without the use of a dispersion agent.

10 Claims, 10 Drawing Sheets

(51) Int. Cl.
*B01J 37/00* (2006.01)
*B01J 29/48* (2006.01)
*B01J 29/78* (2006.01)
*C10G 65/04* (2006.01)
*C10G 47/14* (2006.01)

(56) References Cited

U.S. PATENT DOCUMENTS

| | | | | |
|---|---|---|---|---|
| 8,207,082 | B2* | 6/2012 | Wu | B01J 21/08 |
| | | | | 502/150 |
| 8,394,255 | B2 | 3/2013 | McCarthy et al. | |
| 2010/0187155 | A1 | 7/2010 | McCarthy et al. | |
| 2010/0206775 | A1* | 8/2010 | Beeckman | B01J 21/08 |
| | | | | 208/134 |
| 2011/0056869 | A1 | 3/2011 | Novak et al. | |
| 2011/0105302 | A1 | 5/2011 | Burton | |
| 2011/0315599 | A1 | 12/2011 | Prentice et al. | |
| 2014/0295504 | A1 | 10/2014 | Dufresne et al. | |
| 2015/0158018 | A1* | 6/2015 | Zhan | B01J 29/166 |
| | | | | 208/96 |
| 2015/0209772 | A1 | 7/2015 | Ouwehand et al. | |
| 2016/0145511 | A1 | 5/2016 | Xiaochun et al. | |
| 2017/0175011 | A1 | 6/2017 | McCarthy et al. | |
| 2017/0175015 | A1 | 6/2017 | Podsiadlo et al. | |

FOREIGN PATENT DOCUMENTS

| | | | |
|---|---|---|---|
| EP | 2072127 | A1 | 6/2009 |
| JP | 2014074091 | A | 4/2014 |
| WO | 2013/152577 | A1 | 10/2013 |
| WO | 012017112558 | A1 | 6/2017 |

OTHER PUBLICATIONS

Miale, et al., "Catalysis by crystalline aluminosilicates: IV. Attainable catalytic cracking rate constants, and superactivity", Journal of Catalysis, Oct. 1966, pp. 278-287, vol. 6, iss. 2, Science Direct.
The International Search Report and Written Opinion of PCT/US2018/019125 dated May 17, 2018.
The International Search Report and Written Opinion of PCT/US2016/064144 dated Dec. 21, 2015.
The International Search Report and Written Opinion of PCT/US2016/067423 dated Mar. 27, 2017.
The International Search Report and Written Opinion of PCT/US2016/067717 dated Mar. 27, 2017.
International Search Report and Written Opinion PCT/US2016/064144 dated Mar. 27, 2017.
International Search Report and Written Opinion PCT/US2016/067423 dated Mar. 27, 2017.
International Search Report and Written Opinion PCT/US2016/067717 dated Mar. 27, 2017.
The Office Action for related U.S. Appl. No. 16/061,093 dated Dec. 7, 2018.
The Office Action for related U.S. Appl. No. 15/281,705 dated Dec. 26, 2017.

* cited by examiner

BASE METAL DEWAXING CATALYST

CROSS-REFERENCE TO RELATED APPLICATIONS

This application claims priority to U.S. Provisional Application Ser. No. 62/270,213 filed on Dec. 21, 2015, herein incorporated by reference in its entirety.

FIELD

Base metal dewaxing catalysts with improved activity are provided, including methods of making such base metal dewaxing catalysts and methods for performing dewaxing using such catalysts.

BACKGROUND

Base metal dewaxing catalysts can potentially provide a valuable role in production of distillate boiling range fuels. A base metal dewaxing catalyst that can operate effectively under hydrotreating conditions can be included as part of the catalyst load in a diesel hydrotreating reactor. This can potentially allow a single catalyst load to be used that provides both a desired level of sulfur reduction as well as providing a diesel fuel with improved cold flow properties. However, conventional base metal dewaxing catalysts can have difficulty in providing both a desired level of desulfurization activity and a desired level of dewaxing activity.

PCT Publication No. WO 2013/085533 describes methods for producing diesel fuels with improved cold flow properties by dewaxing of a distillate boiling range portion of a hydrotreated effluent. The hydrotreated effluent can have an organic sulfur content of about 50 wppm or less, but $H_2S$ generated during hydrotreatment can also be cascaded to the dewaxing catalyst to produce a sour dewaxing environment.

U.S. Pat. No. 8,394,255 describes methods for integrated hydrocracking and dewaxing of a feed under sour conditions for formation of diesel and lubricant boiling range fractions.

SUMMARY

In an aspect, a method of forming a dewaxing catalyst is provided. The method can include impregnating a support comprising a zeolitic molecular sieve with a solution. The solution can include at least two types of metal salts. Examples of suitable metal salts include a Group 6 metal salt and a Group 8-10 non-noble metal salt. The solution can also include a dispersion agent. A dispersion agent can correspond to a compound having 2-10 carbon atoms, a compound having a carbon atom to oxygen atom ratio of about 0.6 to about 2.0, or a combination thereof. Optionally, a molar ratio of dispersion agent to at least one metal in solution, such as a Group 8-10 non-noble metal, can be about 0.5 to 10. After impregnating the support, the impregnated support can be dried at a temperature of about 80° C. to about 200° C. to form a dewaxing catalyst. Optionally, the dewaxing catalyst can be sulfided, such as by sulfiding under gas phase sulfidation conditions, liquid phase sulfidation conditions, or a combination thereof.

In another aspect, a dewaxing catalyst can be formed. For example, a dewaxing catalyst can be formed impregnating a support comprising a zeolitic molecular sieve with a solution. The solution can include at least two types of metal salts. Examples of suitable metal salts include a Group 6 metal salt and a Group 8-10 non-noble metal salt. The solution can also include a dispersion agent. A dispersion agent can correspond to a compound having 2-10 carbon atoms, a compound having a carbon atom to oxygen atom ratio of about 0.6 to about 2.0, or a combination thereof. Optionally, a molar ratio of dispersion agent to at least one metal in solution, such as a Group 8-10 non-noble metal, can be about 0.5 to 10. After impregnating the support, the impregnated support can be dried at a temperature of about 80° C. to about 200° C. to form the dewaxing catalyst. Optionally, the dewaxing catalyst can be sulfided, such as by sulfiding under gas phase sulfidation conditions, liquid phase sulfidation conditions, or a combination thereof.

In still another aspect, a dewaxing catalyst as described above and/or made according to the method described above can be used to treat a distillate boiling range feed under effective hydroprocessing conditions. Optionally, the effective hydroprocessing conditions can correspond to at least one of hydrotreating conditions and catalytic dewaxing conditions.

DETAILED DESCRIPTION OF THE EMBODIMENTS

Overview

Figure 1:
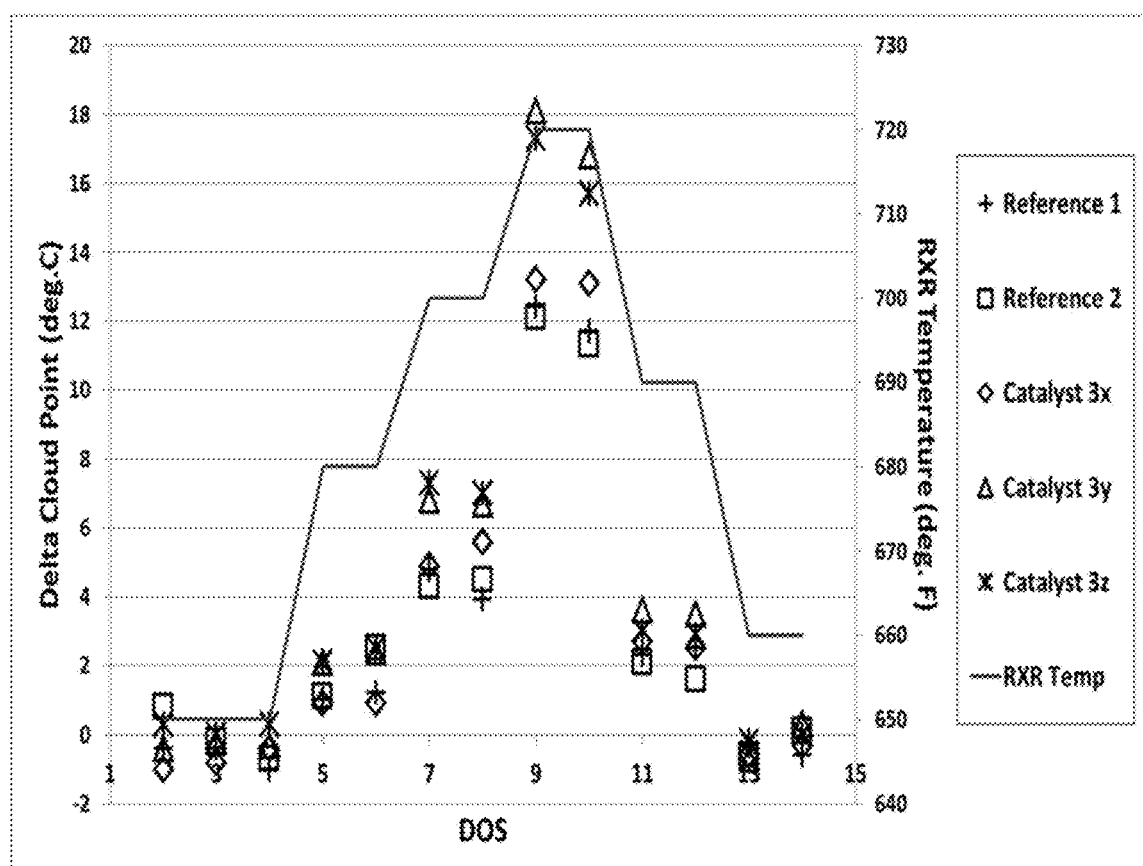
FIG. 1 shows results from processing a distillate feed over a variety of dewaxing catalysts.

In various aspects, methods are provided for making base metal catalysts with improved activity. After forming catalyst particles based on a support comprising a zeolitic molecular sieve, the catalyst particles can be impregnated with a solution comprising a) metal salts (or other precursors) for a plurality of base metals and b) an organic dispersion agent comprising 2 to 10 carbons. The impregnated support particles can be dried to form a base metal catalyst, and then can be sulfided to form a sulfided base metal catalyst. The resulting (sulfided) base metal catalyst can have improved activity for cloud point reduction and/or for improved activity for heteroatom removal relative to a base metal dewaxing catalyst prepared without the use of a dispersion agent. This can allow the resulting (sulfided) base metal catalyst to be used, for example, as a distillate dewaxing catalyst under distillate hydrotreating conditions.

Introducing a dewaxing catalyst into a distillate hydrotreating environment can pose a variety of challenges. Conventional base metal dewaxing catalysts can have a reduced activity for heteroatom removal (e.g., sulfur, nitrogen) and poorer distillate selectivity, as compared to a hydrotreating catalyst. As a result, introducing a conventional dewaxing catalyst into an existing hydrotreatment reactor can require selection of less challenging feeds, a reduction in the amount of feed treated and/or distillate produced, and/or an increase in the required severity of the hydrotreatment reaction conditions. Additionally, because the dewaxing catalyst includes base metals (due to the sour processing conditions typically present in a hydrotreatment reactor), the activity for a base metal dewaxing catalyst to improve cold flow properties such as cloud point can also be reduced.

One or more of the above difficulties can be addressed by using a base metal dewaxing catalyst made by using a dispersion agent during impregnation of the base metals onto the catalyst. Without being bound by any particular theory, it is believed that the dispersion agent can increase dispersion of the base metals on the surface of the support and/or within the pore network of the zeolitic molecular sieve so that an increased number of active sites are available for reaction.

Making Base Metal Dewaxing Catalyst

In various aspects, a base metal dewaxing catalyst can be formed using a support comprising one or more zeolitic molecular sieves. Examples of suitable zeolitic molecular sieves include, but are not limited to, zeolite framework structures having a 10-member ring pore channel as the largest pore size channel in the framework structure. Optionally, the largest pore size channel can be a 1-D channel, a 2-D channel, or a 3-D channel. Suitable framework structure types can include, but are not limited to, a) zeolites where the largest pore size channel has a pore size from about 4.8 Angstroms to about 6.0 Angstroms; b) zeolites where the largest pore size channel corresponds to a 10-member ring; c) molecular sieves of framework type MRE, MTT, EUO, AEL, AFO, SFF, STF, or TON; d) zeolites having the disordered zeolite structure corresponding to ZSM-48; or e) combinations thereof.

In this discussion, a "zeolitic" molecular sieve is defined as a molecular sieve that includes a framework structure geometry that corresponds to a known zeolite framework. Known zeolite frameworks can correspond to those frameworks documented in the database of zeolite structures by the International Zeolite Association. A zeolite (a type of zeolitic molecular sieve) can have a framework structure that is substantially composed of silicon, optionally but typically aluminum, and oxygen. For zeolitic molecular sieves that are not zeolites, other heteroatoms may form part of the framework structure, including structures where silicon and/or aluminum are entirely replaced within the framework structure. Other types of know zeolitic molecular sieves include, but are not limited to, silicoaluminophosphates (SAPOs); aluminophosphates (AlPOs); silicophosphates; and/or other molecular sieves having a zeolite framework structure where a portion of the silicon and/or aluminum atoms in the framework are replaced with other elements, such elements including but not being limited to titanium, gallium, phosphorus, germanium, tin, boron, antimony, zinc, and combinations thereof.

Catalysts can be optionally bound with a binder or matrix material prior to use. Binders can be resistant to temperatures of the use desired and typically assist with attrition resistance. Binders may be catalytically active or inactive and can include other zeolites, other inorganic materials such as clays and metal oxides such as alumina, silica, and silica-alumina. Exemplary clays may include kaolin, bentonite, and/or montmorillonite and can often be commercially available. They may be blended with other materials such as silicates. Other binary porous matrix materials in addition to silica-aluminas can include materials such as silica-magnesia, silica-thoria, silica-zirconia, silica-beryllia, and/or silica-titania. Ternary materials such as silica-alumina-magnesia, silica-alumina-thoria, and/or silica-alumina-zirconia can also be suitable for use as binders. The matrix can be in the form of a co-gel. In some aspects, the base metal dewaxing catalysts can be formulated using a low surface area binder, herein representing a binder with a surface area of about 150 $m^2/g$ or less, e.g., about 130 $m^2/g$ or less, about 100 $m^2/g$ or less, about 80 $m^2/g$ or less, or about 70 $m^2/g$ or less.

The amount of zeolite (or other zeolitic molecular sieve) in a support including a binder can be from about 30 wt % zeolite to about 100 wt % zeolite, relative to the combined weight of binder and zeolite. For example, the amount of zeolite (or other zeolitic molecular sieve) can be from about 30 wt % to about 100 wt %, e.g., from about 30 wt % to about 90 wt %, from about 30 wt % to about 80 wt %, from about 30 wt % to about 70 wt %, from about 50 wt % to about 100 wt %, from about 50 wt % to about 90 wt %, from about 50 wt % to about 80 wt %, from about 50 wt % to about 70 wt %, from about 60 wt % to about 90 wt %, from about 60 wt % to about 80 wt %, or from about 60 wt % to about 70 wt %.

After combining a zeolitic molecular sieve with any optional binder, the zeolitic molecular sieve can be extruded to form support particles. Alternatively, support particles may be formed by any other convenient method. After forming support particles, the support particles can be impregnated with the base metal salts using an impregnation solution that can also include a dispersion agent.

Impregnation, such as impregnation by incipient wetness or ion exchange in solution, is a commonly used technique for introducing metals into a catalyst composition that includes a support. During impregnation, a support can be exposed to a solution containing a salt of the metal for impregnation. There are many variables that can affect the dispersion of the metal salt during impregnation, including the concentration of the salt, the pH of the salt solution, and the point of zero charge of the support material, but not excluding other variables that may also be important during incipient wetness or ion exchange impregnation. Multiple exposure steps can optionally be performed to achieve a desired metals loading on a catalyst. After impregnating a support with a metal salt, the support can be dried to remove excess water. The drying can be performed under any convenient atmosphere, such as air, at an appropriate temperature, such as from about 80° C. to about 200° C. Optionally but preferably, the catalyst can be uncalcined prior to sulfidation.

The base metal salts for impregnation can generally correspond to salts of metals from Groups 6-12 of the Periodic Table based on the IUPAC system having Groups 1-18, e.g., corresponding to metals from Groups 6 and 8-10. Examples of such metals can include Ni, Mo, Co, W, Mn, Cu, Zn, and combinations thereof. Mixtures of hydrogenation metals specifically contemplated can include Co/Mo, Ni/Mo, or Ni/W. After drying of the impregnated support to form a catalyst, the amount of hydrogenation metal(s) (typically considered in their metal oxide form) may range from about 1.0 wt % to about 30 wt %, based on weight of the catalyst precursor. For example, the amount of hydrogenation metals can be from about 1.0 wt % to about 25 wt %, from about 1.0 wt % to about 20 wt %, from about 1.0 wt % to about 15 wt %, from about 1.0 wt % to about 12 wt %, from about 3.0 wt % to about 30 wt %, from about 3.0 wt % to about 25 wt %, from about 3.0 wt % to about 20 wt %, from about 3.0 wt % to about 15 wt %, from about 3.0 wt % to about 12 wt %, from about 5.0 wt % to about 30 wt %, from about 5.0 wt % to about 25 wt %, from about 5.0 wt % to about 20 wt %, from about 5.0 wt % to about 15 wt %, from about 5.0 wt % to about 12 wt %, from about 10 wt % to about 30 wt %, from about 10 wt % to about 25 wt %, from about 10 wt % to about 20 wt %, or from about 10 wt % to about 15 wt %. Suitable metal salts can include typical salts used for aqueous impregnation of catalyst particles.

In addition to water soluble metal salts, the impregnation solution can also include one or more dispersion agents/aids. A dispersion agent/aid can be an organic compound comprising 2 to 10 carbons and having a ratio of carbon atoms to oxygen atoms of about 2 to about 0.6. Optionally, the dispersion agent/aid can be a carboxylic acid. Examples of suitable dispersion agents/aids can include glycols (e.g., ethylene glycol) and carboxylic acids, such as citric acid and/or gluconic acid. Optionally, the dispersion agent can include an amine or other nitrogen-containing compound, such as nitrilotriacetic acid. Without being bound by any particular theory, it is believed that the dispersion agent/aid can be removed from the catalyst during the heating and/or calcination steps performed after impregnation to form oxides from the metal salts.

The amount of dispersion agent/aid in the impregnation solution can be selected based on the amount of metal in the solution. In some aspects, the molar ratio of dispersion agent to total metals in the solution can be from about 0.1 to 5.0, e.g., from about 0.1 to 2.0, from about 0.1 to 1.0, from about 0.2 to 5.0, from about 0.2 to 2.0, from about 0.2 to 1.0, from about 0.3 to 5.0, from about 0.3 to 2.0, from about 0.3 to 1.0, from about 0.4 to 5.0, from about 0.4 to 2.0, or from about 0.4 to 1.0. Additionally or alternatively, for aspects where a non-noble Group 8-10 metal is in the impregnation solution, the molar ratio of dispersion agent to non-noble Group 8-10 metal can be from about 0.5 to 10, e.g., from about 0.5 to 5.0, from about 0.5 to 3.0, about 1.0 to 10, from about 1.0 to 5.0, or from about 1.0 to 3.0.

After forming a catalyst composition with supported base metals, the base metals may be sulfided prior to use to form a sulfided base metal catalyst. The sulfidation of the metals can be performed by any convenient method, such as gas phase sulfidation and/or liquid phase sulfidation. Sulfidation can generally be carried out by contacting a catalyst including metal compounds with a sulfur containing compound, such as elemental sulfur, hydrogen sulfide, and/or a polysulfide. Hydrogen sulfide can be a convenient sulfidation agent for gas phase sulfidation and can be incorporated into a gas phase sulfidation atmosphere containing hydrogen in an amount of about 0.1 wt % to about 10 wt %. Sulfidation can additionally or alternatively be carried out in the liquid phase utilizing a combination of a polysulfide, such as a dimethyl disulfide-spiked hydrocarbon stream, and hydrogen. The sulfidation can be performed at a convenient sulfidation temperature, such as from 150° C. to 500° C. The sulfidation can be performed at a convenient sulfidation pressure, such as 100 psig to 1000 psig or more. The sulfidation time can vary depending on the sulfidation conditions, such that sulfidation times of 1 hour to 72 hours can be suitable. The catalyst may optionally be steamed prior to use.

Processing using Improved Base Metal Dewaxing Catalyst—Feedstock

After forming an improved base metal dewaxing catalyst, the improved base metal dewaxing catalyst can be used for dewaxing of various feeds, such as diesel boiling range feeds and/or lubricant boiling range feeds. One way of defining a feedstock is based on the boiling range of the feed. One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil off. Similarly, a "T95" boiling point is a temperature at 95 wt % of the feed will boil. A suitable ASTM method can be used for characterization of boiling points (including fractional boiling points), such as ASTM D86 or ASTM 2887.

As defined herein, a diesel boiling range feed or fraction can having a boiling range based on a T5 distillation point and/or a T10 distillation point, and a T95 distillation point and/or a T90 distillation point. In various aspects, a diesel boiling range feed or fraction is defined as a feed or fraction with a T5 distillation point of at least 177° C. and a T95 distillation point of 371° C. or less, a T5 distillation point of at least 177° C. and a T90 distillation point of 371° C. or less, a T10 distillation point of at least 177° C. and a T95 distillation point of 371° C. or less, or a T10 distillation point of at least 177° C. and a T90 distillation point of 371° C. or less. As defined herein, a lubricant boiling range feed or fraction can having a boiling range based on a T5 distillation point and/or a T10 distillation point, and a T95 distillation point and/or a T90 distillation point. In various aspects, a lubricant boiling range feed or fraction is defined as a feed or fraction with a T5 distillation point of at least 371° C. and a T95 distillation point of 510° C. or less, a T5 distillation point of at least 371° C. and a T90 distillation point of 510° C. or less, a T10 distillation point of at least 371° C. and a T95 distillation point of 510° C. or less, or a T10 distillation point of at least 371° C. and a T90 distillation point of 510° C. or less. As defined herein, a distillate boiling range can be defined that represents a combination of the diesel and lubricant boiling ranges. Thus, a distillate boiling range feed or fraction can be defined as a feed or fraction with a T5 distillation point of at least 177° C. and a T95 distillation point of 510° C. or less, a T5 distillation point of at least 177° C. and a T90 distillation point of 510° C. or less, a T10 distillation point of at least 177° C. and a T95 distillation point of 510° C. or less, or a T10 distillation point of at least 177° C. and a T90 distillation point of 510° C. or less.

A wide range of petroleum and chemical feedstocks can be hydroprocessed in reaction systems including a dewaxing catalyst formed using a plurality of structure directing agents. Suitable feedstocks can include whole and/or reduced petroleum crudes, atmospheric and/or vacuum residua, propane deasphalted residua, e.g., brightstock, cycle oils, FCC tower bottoms, gas oils, including vacuum gas oils and coker gas oils, light to heavy distillates including raw virgin distillates, hydrocrackates, hydrotreated oils, slack waxes, Fischer-Tropsch waxes, raffinates, and mixtures of these materials.

In embodiments involving an initial sulfur removal stage prior to hydrocracking, the sulfur content of the feed can be at least 300 ppm by weight of sulfur, e.g., at least 1000 wppm, at least 2000 wppm, at least 4000 wppm, at least 5000 wppm, at least 10000 wppm, or at least 20000 wppm. In other embodiments, including some embodiments where a previously hydrotreated and/or hydrocracked feed is used, the sulfur content can be 2000 wppm or less, e.g., 1000 wppm or less, 500 wppm or less, 300 wppm or less, or 100 wppm or less.

In some aspects, an improved base metal dewaxing catalyst can be used to provide an improved amount of cloud point reduction when exposed to a diesel and/or lubricant boiling range feed under effective dewaxing conditions and/or effective hydrotreating conditions. Effective conditions for catalytic dewaxing and hydrotreating are described in greater detail below. Optionally, additional benefit in cloud point reduction can be obtained by performing dewaxing and/or hydrotreatment at higher temperatures, such as at least about 680° F. (~360° C.), at least about 700° F. (~371° C.), or at least about 716° F. (~380° C.). In combination with typical end of run temperatures, the additional benefit in cloud point reduction can be achieved for dewaxing temperatures of about 360° C. to about 450° C., e.g., about 360° C. to about 425° C., about 370° C. to about 450° C., about 370° C. to about 425° C., about 380° C. to about 450° C., or about 380° C. to about 425° C.

Additionally or alternatively, some aspects, an improved base metal dewaxing catalyst can be used to provide an improved amount of hydrotreating activity (desulfurization activity and/or denitrogenation activity) when exposed to a diesel and/or lubricant boiling range feed under effective dewaxing conditions and/or effective hydrotreating conditions. Effective conditions for catalytic dewaxing and hydrotreating are described in greater detail below. Optionally, additional benefit in hydrotreating activity can be obtained when the base metal dewaxing catalyst comprises a low surface area binder, such as a low surface area alumina binder. Optionally, additional benefit in hydrotreating activity can be obtained by performing dewaxing and/or hydrotreatment at higher temperatures, such as at least about 680° F. (~360° C.), at least about 700° F. (~371° C.), or at least about 716° F. (~380° C.). In combination with typical end of run temperatures, the additional benefit in cloud point reduction can be achieved for dewaxing temperatures of about 360° C. to about 450° C., e.g., about 360° C. to about 425° C., about 370° C. to about 450° C., about 370° C. to about 425° C., about 380° C. to about 450° C., or about 380° C. to about 425° C.

For reaction system configurations where a diesel boiling range product is produced based in part on exposure of a feed to a base metal dewaxing catalyst, the diesel boiling range product can have a cloud point of about −10° C. or less, e.g., about −20° C. or less, about −30° C. or less, or about −40° C. or less. Additionally or alternatively, the diesel boiling range product can have a sulfur content of about 100 wppm of sulfur or less, e.g., about 50 wppm or less, about 25 wppm or less, about 15 wppm or less, or about 10 wppm or less. Additionally or alternatively, the diesel boiling range product can have a nitrogen content of about 100 wppm of nitrogen or less, e.g., about 50 wppm or less, about 25 wppm or less, about 15 wppm or less, or about 10 wppm or less.

Examples of Reaction Systems for Hydroprocessing

In the discussion herein, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

In the discussion herein, reference will be made to a hydroprocessing reaction system. The hydroprocessing reaction system can correspond to the one or more stages, such as two stages/reactors and an optional intermediate separator, used to expose a feed to a plurality of catalysts under hydroprocessing conditions. The plurality of catalysts can be distributed between the stages/reactors in any convenient manner, with some exemplary methods of arranging the catalyst described herein.

Various types of hydroprocessing can be used in the production of distillate fuels and/or lubricant base oils. In some aspects, diesel boiling range fuel products can be formed by exposing a diesel and/or distillate boiling range feed to hydrotreating catalyst and a base metal dewaxing catalyst under effective hydrotreating conditions. Optionally, the hydrotreating catalyst and the base metal dewaxing catalyst can be located in the same reactor. Optionally, the hydrotreating catalyst and the base metal dewaxing catalyst can be located within the same catalyst bed in a reactor. Optionally, the effluent (or at least a portion thereof) from exposing the feed to the hydrotreating catalyst and the base metal dewaxing catalyst can be exposed to an aromatic saturation catalyst. This type of configuration can allow for production of a diesel boiling range product with reduced sulfur content, reduced nitrogen content, and/or improved cold flow properties.

In other aspects, diesel boiling range fuel products can be formed by exposing a diesel and/or distillate boiling range feed to hydrotreating catalyst under effective hydrotreating conditions and a base metal dewaxing catalyst under effective dewaxing conditions. Optionally, the hydrotreating catalyst and the base metal dewaxing catalyst can be located in the same reactor. Optionally, the effluent (or at least a portion thereof) from exposing the feed to the hydrotreating catalyst and the base metal dewaxing catalyst can be exposed to an aromatic saturation catalyst. This type of configuration can allow for production of a diesel boiling range product with reduced sulfur content, reduced nitrogen content, and/or improved cold flow properties.

In still other aspects, diesel boiling range products and lubricant boiling range products can be formed by exposing a lubricant and/or distillate boiling range feed to hydrotreating catalyst under effective hydrotreating conditions; hydrocracking catalyst under effective hydrocracking conditions; and a base metal dewaxing catalyst under effective dewaxing conditions. Optionally, a separation can be performed on hydrotreated effluent and/or hydrocracked effluent prior to at least one additional stage of hydrotreatment and/or hydrocracking. This separation, when utilized, can correspond to a separation to remove light ends ($C_{4-}$) and/or can allow for separation of any fuels boiling range material formed during the exposure to the hydrotreating and/or hydrocracking catalyst(s). Optionally, a separation can be performed on hydrotreated effluent and/or hydrocracked effluent prior to at least one stage of catalytic dewaxing. This separation can correspond to a separation to remove light ends ($C_{4-}$) and/or can allow for separation of any fuels boiling range material formed during the exposure to the hydrotreating and/or hydrocracking catalyst(s). Optionally, the effluent (or at least a portion thereof) from exposing the feed to the base metal dewaxing catalyst can be exposed to an aromatic saturation catalyst. This type of configuration can allow for production of diesel boiling range product and/or lubricant boiling range product with reduced sulfur content, reduced nitrogen content, and/or improved cold flow properties.

Figure 8:
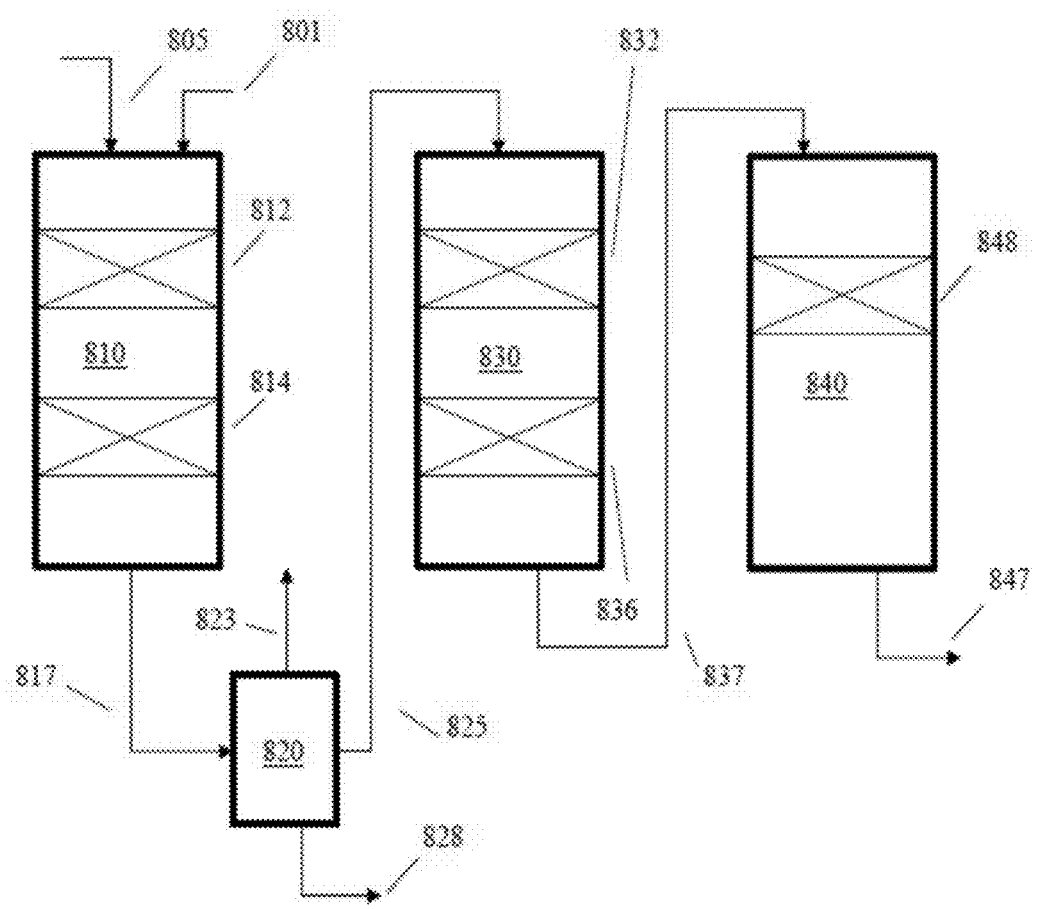
FIG. 8 shows an example of a configuration for hydroprocessing of a distillate boiling range feed.

FIG. 8 shows an example of a reaction system for hydroprocessing of a feed for fuels and/or lubricant base oil production. In the example shown in FIG. 8, a suitable feed 805 can be introduced into a first reactor (or reactors) 810. Hydrogen can be introduced at one or more of various locations within the reaction system, such as hydrogen-containing stream 801. Reactor 810 is schematically shown as including at least one bed 812 of hydrotreating catalyst and at least one bed 814 of hydrocracking catalyst. Either hydrotreating catalyst bed(s) 812 or hydrocracking bed(s) 814 can be optional. After exposing the feed to the hydrotreating and/or hydrocracking catalyst under effective conditions, the resulting first effluent 817 can be passed into a separator 820. In some aspects, separator 820 can be a gas-liquid type separator for removing contaminant gases 823 generated during hydrotreatment and/or hydrocracking, such as $H_2S$ or $NH_3$. This can allow subsequent stages or catalyst beds in the reaction system to operate as "sweet" reaction stages. In other aspects, separator 820 can allow for separation of liquid hydrocarbon products 828 from the effluent below a desired cut point. For example, for a system for lubricant base oil production, separator 820 can allow for separation of both diesel and naphtha boiling range compounds, optionally as one or more separate streams, such as one or more diesel streams, one or more kerosene and/or jet streams, and/or one or more naphtha streams. As another example, for a system for diesel fuel production, separator 820 might separate out diesel and lower boiling range compounds, or separator 820 may separate out naphtha boiling range compounds while retaining diesel with the primary process flow.

After passing through separator 820, the remaining portion 825 of the effluent can be passed into a second reactor (or reactors) 830. In the example shown in FIG. 8, reactor 830 includes at least one (optional) bed 832 of a hydrotreating and/or hydrocracking catalyst and at least one bed 836 of a dewaxing catalyst. The dewaxing catalyst bed 836 can include at least a portion of a ZSM-48 catalyst made using a plurality of structure directing agents, as described herein. The resulting dewaxed effluent 837 can then be passed into a third reactor (or reactors) 840 for exposure to at least one (optional) bed 848 of hydrofinishing and/or aromatic saturation catalyst. Either the dewaxed effluent 837 or the hydrofinished effluent 847 can be fractionated (not shown) in order to form one or more product streams, such as lubricant base oils, distillate fuel fractions, or naphtha fuel fractions.

In some alternative aspects, a reaction system for fuels production can include fewer reactors and/or stages than the system shown in FIG. 8. For example, for hydrotreatment and dewaxing of a diesel boiling range feed and/or distillate boiling range feed for production of diesel boiling range products, just reactor 810 could be used. In such an example, a suitable feed 805 can be introduced into a first reactor (or reactors) 810. Hydrogen can also be introduced at various locations within the reaction system, such as hydrogen-containing stream 801. In this type of example, reactor 810 could include at least one bed 812 of hydrotreating catalyst and at least one bed 814 of base metal dewaxing catalyst. Alternatively, just bed(s) 812 could be included, with base metal dewaxing catalyst being included in the beds along with the hydrotreating catalyst.

Hydrotreatment Conditions

Hydrotreatment can typically be used to reduce the sulfur, nitrogen, and, depending on severity of conditions, aromatic content of a feed. The catalysts used for hydrotreatment can include conventional hydroprocessing catalysts, for example those that comprise at least one Group VIII non-noble metal (Columns 8-10 of IUPAC periodic table), such as Fe, Co, and/or Ni, optionally Co and/or Ni; and at least one Group VI metal (Column 6 of IUPAC periodic table), such as Mo and/or W. Such hydroprocessing catalysts optionally include transition metal sulfides impregnated or dispersed on a refractory support/carrier, such as alumina and/or silica. The support or carrier itself typically has little or no significant/measurable catalytic activity. Substantially carrier-/support-free catalysts, commonly referred to as bulk catalysts, can generally have higher volumetric activities than their supported counterparts.

The catalysts can either be in bulk form or in supported form. In addition to alumina and/or silica, other suitable support/carrier materials can include, but are not limited to, zeolites, titania, silica-titania, and/or titania-alumina. Suitable aluminas can include porous aluminas, such as gamma and/or eta, having average pore sizes from 50 to 200 Å (e.g., from 75 to 150 Å), a surface area from 100 to 300 m$^2$/g (e.g., from 150 to 250 m$^2$/g), and a pore volume from 0.25 to 1.0 cm$^3$/g (e.g., from 0.35 to 0.8 cm$^3$/g). More generally, any convenient size, shape, and/or pore size distribution for a catalyst suitable for hydrotreatment of a distillate (optionally including lubricant base oil) boiling range feed in a conventional manner may be used. It is noted that more than one type of hydroprocessing catalyst can be used in one or multiple reaction vessels.

The at least one Group VIII non-noble metal, in oxide form, can be present in an amount ranging from 2 wt % to 40 wt %, e.g., from 4 wt % to 15 wt %. The at least one Group VI metal, in oxide form, can be present in an amount ranging from 2 wt % to 70 wt %, or for supported catalysts from 6 wt % to 40 wt % (e.g., from 10 wt % to 30 wt %). These weight percents are based on the total weight of the catalyst. Suitable metal catalysts can include cobalt/molybdenum (~1-10% Co as oxide, ~10-40% Mo as oxide), nickel/molybdenum (~1-10% Ni as oxide, ~10-40% Co as oxide), or nickel/tungsten (~1-10% Ni as oxide, ~10-40% W as oxide) on alumina, silica, silica-alumina, or titania.

The hydrotreatment is carried out in the presence of hydrogen. A hydrogen stream can therefore be fed or injected into a vessel or reaction zone or hydroprocessing zone in which the hydroprocessing catalyst is located. Hydrogen, which is contained in a hydrogen "treat gas," can be provided to the reaction zone. Treat gas can be either pure hydrogen or a hydrogen-containing gas, which can contain hydrogen in an amount sufficient for the intended reaction(s), optionally including one or more other gases (e.g., nitrogen and/or light hydrocarbons such as methane), and which should not substantially adversely interfere with/affect either the reactions or the products. Impurities, such as $H_2S$ and $NH_3$, can be undesirable and can typically be removed from the treat gas before being conducted to the reactor. In aspects where the treat gas stream introduced into a reaction stage contains components other than hydrogen, the treat gas can contain at least 50 vol % $H_2$, e.g., at least 75 vol %, at least 90 vol %, at least 95 vol %, or at least 99 vol %.

Hydrogen can be supplied at a rate from 100 SCF/B (standard cubic feet of hydrogen per barrel of feed) (~17 Nm$^3$/m$^3$) to 1500 SCF/B (~250 Nm$^3$/m$^3$). In some embodiments, the hydrogen can be provided in a range from 200 SCF/B (~34 Nm$^3$/m$^3$) to 1200 SCF/B (~200 Nm$^3$/m$^3$). Hydrogen can be supplied co-currently with the input feed to the hydrotreatment reactor/zone and/or separately via a separate gas conduit to the hydrotreatment reactor/zone.

Hydrotreating conditions can include temperatures of 200° C. to 450° C., e.g., 315° C. to 425° C., pressures of 250 psig (~1.8 MPag) to 5000 psig (~34.6 MPag), e.g., 300 psig (~2.1 MPag) to 3000 psig (~20.7 MPag), liquid hourly space velocities (LHSV) of 0.1 hr$^{-1}$ to 10 hr$^{-1}$; and hydrogen treat rates of 200 scf/B (~34 Nm$^3$/m$^3$) to 10000 scf/B (~1700 Nm$^3$/m$^3$), or 500 scf/B (~85 Nm$^3$/m$^3$) to 10000 scf/B (~1700 Nm$^3$/m$^3$).

Hydrocracking Conditions

In various aspects, the reaction conditions in the reaction system can be selected to generate a desired level of conversion of a feed. Conversion of the feed can be defined in terms of conversion of molecules that boil above a temperature threshold to molecules below that threshold. The conversion temperature can be any convenient temperature, such as 700° F. (371° C.). In an aspect, the amount of conversion in the stage(s) of the reaction system can be selected to enhance diesel production while achieving a substantial overall yield of fuels. The amount of conversion can correspond to the total conversion of molecules within any stage of the fuels hydrocracker or other reaction system that is used to hydroprocess the lower boiling portion of the feed from the vacuum distillation unit. Suitable amounts of conversion of molecules boiling above 700° F. to molecules boiling below 700° F. include converting at least 25% of the 700° F.+ portion of the feedstock to the stage(s) of the reaction system, e.g., at least 40%, at least 50%, at least 60%, at least 70%, or at least 75%. Additionally or alternatively, the amount of conversion for the reaction system can be 85% or less, e.g., 80% or less, 75% or less, 70% or less, 60% or less, or 50% or less. Each of the above lower bounds on the amount of conversion is explicitly contemplated in conjunction with each of the above upper bounds. Still larger amounts of conversion may produce a suitable hydrocracker bottoms for forming lubricant base oils, but such higher conversion amounts can also typically result in a reduced yield of lubricant base oils. Reducing the amount of conversion can increase the yield of lubricant base oils, but reducing the amount of conversion to below the ranges noted above may result in hydrocracker bottoms unsuitable for formation of Group II, Group II+, and/or Group III lubricant base oils.

In order to achieve a desired level of conversion, a reaction system can include at least one hydrocracking catalyst. Hydrocracking catalysts can typically contain sulfided base metals on acidic supports, such as amorphous silica-alumina, cracking zeolites such as USY, or acidified aluminas. Often these acidic supports can be mixed/bound with other metal oxides such as alumina, titania, and/or silica. Examples of suitable acidic supports can include acidic molecular sieves, such as zeolites and/or silicoaluminophosphates. One example of suitable zeolite can include USY, such as a USY zeolite with cell size of ~24.25 Angstroms or less. Additionally or alternatively, the catalyst can be a low acidity molecular sieve, such as a USY zeolite with an Si to Al ratio of at least 20, for example at least 40 or at least 50. Zeolite Beta is another example of a potentially suitable hydrocracking catalyst. Non-limiting examples of metals for hydrocracking catalysts can include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternatively, hydrocracking catalysts with Group VIII noble metals can be used. Non-limiting examples of noble metal catalysts can include those based on platinum and/or palladium. Support materials which may be used for the noble and/or non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

In various aspects, the conditions selected for hydrocracking for fuels and/or lubricant base stock production can depend on the desired level of conversion, the level of contaminants in the input feed to a hydrocracking stage, and potentially other factors. For example, hydrocracking conditions in a first stage (such as a sour stage) and/or a second stage (such as a sweet stage) can be selected to achieve a desired level of conversion in the reaction system. A hydrocracking process in the first stage (or otherwise under sour conditions) can be carried out at temperatures of 550° F. (288° C.) to 840° F. (449° C.), hydrogen partial pressures of 250 psig to 5000 psig (1.8 MPag to 34.6 MPag), liquid hourly space velocities of 0.05 h$^{-1}$ to 10 h$^{-1}$, and hydrogen treat gas rates of 34 Nm$^3$/m$^3$ to 1700 Nm$^3$/m$^3$ (~200 SCF/B to ~10000 SCF/B). In other embodiments, the conditions can include temperatures in the range of 600° F. (343° C.) to 815° F. (435° C.), hydrogen partial pressures of 500 psig to 3000 psig (3.5 MPag to 20.9 MPag), and hydrogen treat gas rates of 200 Nm$^3$/m$^3$ to 1020 Nm$^3$/m$^3$ (~1200 SCF/B to ~6000 SCF/B). The LHSV relative to only the hydrocracking catalyst can be from 0.25 h$^{-1}$ to 50 h$^{-1}$, such as from 0.5 h$^{-1}$ to 20 h$^{-1}$ or from 1.0 h$^{-1}$ to 4.0 h$^{-1}$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as 350° F. (177° C.) or 400° F. (204° C.), and a portion boiling above the temperature cut point. In this type of separation, the naphtha boiling range portion of the effluent from the first reaction stage can be removed, thus reducing the volume of effluent processed in the second or other subsequent stages. Of course, any low boiling contaminants in the effluent from the first stage could be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least 350° F. (177° C.), or at least 400° F. (204° C.), to having an upper end cut point temperature of 700° F. (371° C.) or less, or 650° F. (343° C.) or less. Optionally, the distillate fuel range can be extended to include additional kerosene, such as by selecting a lower end cut point temperature of at least 300° F. (149° C.).

In aspects where the inter-stage separator can be used to produce a distillate fuel fraction, the portion boiling below the distillate fuel fraction can include naphtha boiling range molecules, light ends, and contaminants such as $H_2S$. These different products can be separated from each other in any convenient manner. Similarly, one or more distillate fuel fractions can be formed, if desired, from the distillate boiling range fraction. The portion boiling above the distillate fuel range represents potential lubricant base oils. In such aspects, the portion boiling above the distillate fuel range can optionally be subjected to further hydroprocessing in a second hydroprocessing stage.

A hydrocracking process in a second stage (or otherwise under non-sour conditions) can be performed under conditions similar to those used for a first stage hydrocracking process, or the conditions can be different. In an embodiment, the conditions in a second stage can have less severe conditions than a hydrocracking process in a first (sour) stage. The temperature in the hydrocracking process can be at least 40° F. (22° C.) less than the temperature for a hydrocracking process in the first stage, e.g., at least 80° F. (44° C.) less or at least 120° F. (66° C.) less, optionally not more than 200° F. (110° C.) less. The pressure for a hydrocracking process in a second stage can be at least 100 psig (700 kPag) less than a hydrocracking process in the first stage, e.g., at least 200 psig (1.4 MPag) less or at least 300 psig (2.1 MPag) less, optionally not more than 1000 psig (6.9 MPag) less. Additionally or alternatively, suitable hydrocracking conditions for a second (non-sour) stage can include, but are not limited to, conditions similar to a first or sour stage. Suitable hydrocracking conditions can include temperatures of 550° F. (288° C.) to 840° F. (449° C.), hydrogen partial pressures of 250 psig to 5000 psig (1.8 MPag to 35 MPag), liquid hourly space velocities of 0.05 $h^{-1}$ to 10 $h^{-1}$, and hydrogen treat gas rates of from 34 $Nm^3/m^3$ to 1700 $Nm^3/m^3$ (~200 SCF/B to ~10000 SCF/B). In other embodiments, the conditions can include temperatures in the range of 600° F. (343° C.) to 815° F. (435° C.), hydrogen partial pressures of 500 psig to 3000 psig (3.5 MPag-20.9 MPag), and hydrogen treat gas rates of 200 $Nm^3/m^3$ to 1020 $Nm^3/m^3$ (~1200 SCF/B to ~6000 SCF/B). The liquid hourly space velocity can vary depending on the relative amount of hydrocracking catalyst used versus dewaxing catalyst. Relative to the combined amount of hydrocracking and dewaxing catalyst, the LHSV can be from 0.2 $h^{-1}$ to 10 $h^{-1}$, such as from 0.5 $h^{-1}$ to 5 $h^{-1}$ and/or from 1 $h^{-1}$ to 4 $h^{-1}$. Depending on the relative amount of hydrocracking catalyst and dewaxing catalyst used, the LHSV relative to only the hydrocracking catalyst can be from 0.25 $h^{-1}$ to 50 $h^{-1}$, such as from 0.5 $h^{-1}$ to 20 $h^{-1}$ or from 1.0 $h^{-1}$ to 4.0 $h^{-1}$.

In still another embodiment, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be about the same.

Catalytic Dewaxing Process

In some aspects, base metal dewaxing catalyst can be included in the same stage and/or the same reactor and/or the same bed as hydrotreating catalyst. The base metal dewaxing catalyst can be mixed with the hydrotreating catalyst and/or the base metal dewaxing catalyst can be downstream (within the same bed or in a different bed) relative to at least a portion of the hydrotreating catalyst or relative to substantially all of the hydrotreating catalyst.

In other aspects, base metal dewaxing catalyst can be located in a bed downstream from any hydrocracking catalyst stages and/or any hydrocracking catalyst present in a stage. This can allow the dewaxing to occur on molecules that have already been hydrotreated or hydrocracked to remove a significant fraction of organic sulfur- and nitrogen-containing species. The dewaxing catalyst can be located in the same reactor as at least a portion of the hydrocracking catalyst in a stage. Alternatively, the effluent from a reactor containing hydrocracking catalyst, possibly after a gas-liquid separation, can be fed into a separate stage or reactor containing the dewaxing catalyst. In still other aspects, dewaxing catalyst can be used in a catalyst bed prior to (i.e., upstream relative to the process flow) at least one bed of hydrotreating and/or hydrocracking catalyst.

In various aspects, at least a portion of the dewaxing catalyst can correspond to a base metal dewaxing catalyst as described herein. Such a dewaxing catalyst can be used alone, or in conjunction with one or more other additional dewaxing catalysts.

Additional suitable dewaxing catalysts can include molecular sieves such as crystalline aluminosilicates (e.g., zeolites). In an embodiment, the molecular sieve can comprise, consist essentially of, or be ZSM-5, ZSM-11, ZSM-22, ZSM-23, ZSM-35, ZSM-48, zeolite Beta, TON (Theta-1), or a combination thereof, for example ZSM-23 and/or ZSM-48, or ZSM-48 and/or zeolite Beta. Optionally, molecular sieves selective for dewaxing by isomerization as opposed to cracking can be used, such as ZSM-48, zeolite Beta, ZSM-23, or a combination thereof. Additionally or alternatively, the molecular sieve can comprise, consist essentially of, or be a 10-member ring 1-D molecular sieve. Examples can include EU-1, ZSM-35 (or ferrierite), ZSM-11, ZSM-57, NU-87, SAPO-11, ZSM-48, ZSM-23, and/or ZSM-22; for example EU-2, EU-11, ZBM-30, ZSM-48, and/or ZSM-23; such as including at least ZSM-48. Note that a zeolite having the ZSM-23 structure with a silica to alumina ratio from ~20:1 to ~40:1 can sometimes be referred to as SSZ-32. Other molecular sieves isostructural with the above materials can include NU-10, EU-13, KZ-1, and/or NU-23. Optionally, the additional dewaxing catalyst(s) can include a binder for the molecular sieve, such as alumina, titania, silica, silica-alumina, zirconia, or a combination thereof, for example alumina and/or titania or silica and/or zirconia and/or titania.

In some aspects, the additional dewaxing catalyst(s) used in processes according to the invention can be catalysts with a low ratio of silica to alumina. For example, for ZSM-48, the ratio of silica to alumina in the zeolite can be less than 200:1, such as less than 150:1, less than 110:1, less than 100:1, less than 90:1, or less than 75:1. In various embodiments, the ratio of silica to alumina can be from 50:1 to 200:1, such as from 60:1 to 160:1, from 60:1 to 130:1, from 60:1 to 110:1, from 70:1 to 130:1, from 70:1 to 110:1, or from 70:1 to 100:1.

In various aspects, the additional dewaxing catalyst(s) can further include a metal hydrogenation component. The metal hydrogenation component can typically be a Group VI and/or a Group VIII metal, such as a Group VIII noble metal. For example, the metal hydrogenation component can be Pt and/or Pd. In an alternative aspect, the metal hydrogenation component can be a combination of a non-noble Group VIII metal with a Group VI metal. Suitable combinations can include Ni, Co, and/or Fe with Mo and/or W, particularly Ni with Mo and/or W.

The metal hydrogenation component may be added to an additional catalyst in any convenient manner. One technique for adding the metal hydrogenation component can be by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor can be added to a mixture of zeolite (or of zeolite and binder) prior to extrusion.

The amount of metal in an additional dewaxing catalyst can be at least 0.1 wt % based on catalyst weight, e.g., at least 0.15 wt %, at least 0.2 wt %, at least 0.25 wt %, at least 0.3 wt %, or at least 0.5 wt %. The amount of metal in the catalyst can additionally or alternatively be 20 wt % or less based on catalyst weight, e.g., 10 wt % or less, 5 wt % or less, 2.5 wt % or less, or 1 wt % or less. For aspects where the metal is Pt, Pd, another Group VIII noble metal, or a combination thereof, the amount of metal can be from 0.1 to 5 wt %, e.g., from 0.1 to 2 wt %, from 0.25 to 1.8 wt %, or from 0.4 to 1.5 wt %. For embodiments where the metal is a combination of a non-noble Group VIII metal with a Group VI metal, the combined amount of metal can be from 0.5 wt % to 20 wt %, e.g., from 1 wt % to 15 wt % or from 2.5 wt % to 10 wt %.

The additional dewaxing catalysts useful in processes according to the invention can also include a binder. In some aspects, the dewaxing catalysts can be formulated using a low surface area binder, a low surface area binder represents a binder with a surface area of 100 m²/g or less, e.g., 80 m²/g or less or 70 m²/g or less. The amount of zeolite in a catalyst formulated using a binder can be from 30 wt % zeolite to 90 wt % zeolite, relative to the combined weight of binder and zeolite. In many embodiments, the amount of zeolite can be at least 50 wt % of the combined weight of zeolite and binder, such as at least 60 wt % or from 65 wt % to 80 wt %. Optionally, the dewaxing catalyst can include a binder for the molecular sieve, such as alumina, titania, silica, silica-alumina, zirconia, or a combination thereof. In certain embodiments, the binder can include or be alumina. In another embodiment, the binder can include or be alumina and/or titania. In still another embodiment, the binder can include or be titania, silica, zirconia, or a combination thereof.

A zeolite (or zeolitic molecular sieve) can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can be used to modify the extrusion flow properties of the zeolite and binder mixture.

Process conditions in a catalytic dewaxing zone can include a temperature of 200° C. to 450° C., e.g., 270° C. to 400° C., a hydrogen partial pressure of 1.8 MPag to 35 MPag (250 psig to 5000 psig), e.g., 4.9 MPag to 20.9 MPag, and a hydrogen treat gas rate of 34 Nm³/m³ (~200 SCF/B) to 1700 Nm³/m³ (~10000 scf/B), e.g., 170 Nm³/m³ (~1000 SCF/B) to 850 Nm³/m³ (~5000 SCF/B). In still other embodiments, the conditions can include temperatures in the range of 600° F. (343° C.) to 815° F. (435° C.), hydrogen partial pressures of 500 psig to 3000 psig (3.5 MPag to 20.9 MPag), and hydrogen treat gas rates of 200 Nm³/m³ to 1020 Nm³/m³ (~1200 SCF/B to ~6000 SCF/B). These latter conditions may be suitable, for example, if the dewaxing stage is operating under sour conditions. The liquid hourly space velocity (LHSV) can be from 0.2 h⁻¹ to 10 h⁻¹, such as from 0.5 h⁻¹ to 5 h⁻¹ and/or from 1 h⁻¹ to 4 h⁻¹.

Additionally or alternately, the conditions for dewaxing can be selected based on the conditions for a preceding reaction in the stage, such as hydrocracking conditions and/or hydrotreating conditions. Such conditions can be further modified using a quench between previous catalyst bed(s) and the bed for the dewaxing catalyst. Instead of operating the dewaxing process at a temperature corresponding to the exit temperature of the prior catalyst bed, a quench can be used to reduce the temperature for the hydrocarbon stream at the beginning of the dewaxing catalyst bed. One option can be to use a quench to have a temperature at the beginning of the dewaxing catalyst bed that is the same as the outlet temperature of the prior catalyst bed. Another option can be to use a quench to have a temperature at the beginning of the dewaxing catalyst bed at least 10° F. (6° C.) lower than the prior catalyst bed, e.g., at least 20° F. (11° C.) lower, at least 30° F. (16° C.) lower, or at least 40° F. (21° C.) lower, optionally up to 150° F. (90° C.) lower.

As still another option, the dewaxing catalyst in the final reaction stage can be mixed with another type of catalyst, such as hydrotreating catalyst, in at least one bed in a reactor. As yet another option, a hydrocracking catalyst and a dewaxing catalyst can be co-extruded with a single binder to form a mixed functionality catalyst.

Hydrofinishing and/or Aromatic Saturation Process

In some aspects, a hydrofinishing and/or aromatic saturation stage can also be provided. The hydrofinishing and/or aromatic saturation can occur after the last hydrocracking or dewaxing stage. The hydrofinishing and/or aromatic saturation can occur either before or after fractionation. If hydrofinishing and/or aromatic saturation occur(s) after fractionation, the hydrofinishing can be performed on one or more portions of the fractionated product, such as the bottoms from the reaction stage (e.g., hydrocracker bottoms). Alternatively, the entire effluent from the last hydrocracking and/or dewaxing process can be hydrofinished and/or undergo aromatic saturation.

In some situations, a hydrofinishing process and an aromatic saturation process can refer to a single process performed using the same catalyst. Alternatively, one type of catalyst or catalyst system can be provided to perform aromatic saturation, while a second catalyst or catalyst system can be used for hydrofinishing. Typically a hydrofinishing and/or aromatic saturation process can be performed in a separate reactor from dewaxing or hydrocracking processes for practical reasons, such as facilitating use of a lower temperature for the hydrofinishing or aromatic saturation process. However, an additional hydrofinishing reactor following a hydrocracking or dewaxing process but prior to fractionation could still be considered part of a second stage of a reaction system conceptually.

Hydrofinishing and/or aromatic saturation catalysts can include catalysts containing Group VI metals, Group VIII metals, and mixtures thereof. In an embodiment, the metals can include at least one metal sulfide having a strong hydrogenation function. In another embodiment, the hydrofinishing catalyst can include a Group VIII noble metal, such as Pt and/or Pd. The mixture of metals may be present as bulk metal catalysts where the amount of metal can be 30 wt % or greater, based on catalyst weight. Suitable metal oxide supports can include low acidic oxides such as silica, alumina, silica-aluminas, and/or titania, particularly at least including alumina. Advantageous hydrofinishing catalysts for aromatic saturation can comprise at least one metal having relatively strong hydrogenation function on a porous support. Typical support materials can include amorphous and/or crystalline oxide materials such as alumina, silica, or silica-alumina. The support materials may be modified, such as by halogenation, or, in particular, fluorination. The metal content of the catalyst can often be as high as 20 wt % for non-noble metals. In an embodiment, a hydrofinishing catalyst can include a crystalline material belonging to the M41S class or family of catalysts, which are mesoporous materials typically having high silica content. Examples include MCM-41, MCM-48, and MCM-50, particularly MCM-41. If separate catalysts are used for aromatic saturation and hydrofinishing, an aromatic saturation catalyst can be selected based on activity and/or selectivity for aromatic saturation, while a hydrofinishing catalyst can be selected based on activity for improving product specifications, such as product color and/or polynuclear aromatic content reduction.

Hydrofinishing conditions can include temperatures from 125° C. to 425° C., such as 180° C. to 280° C., a hydrogen partial pressure from 500 psig (3.5 MPag) to 3000 psig (20.9 MPag), such as 1500 psig (~10.5 MPa) to 2500 psig (~17.5 MPa), and liquid hourly space velocity from 0.1 hr$^{-1}$ to 5 hr$^{-1}$ LHSV, such as 0.5 hr$^{-1}$ to 2.0 hr$^{-1}$. Additionally, a hydrogen treat gas rate from 34 Nm$^3$/m$^3$ to 1700 Nm$^3$/m$^3$ (~200 SCF/B to ~10000 SCF/B) can be used.

After hydroprocessing, the bottoms from the hydroprocessing reaction system can have a viscosity index (VI) of at least 95, such as at least 105 or at least 110. The amount of saturated molecules in the bottoms from the hydroprocessing reaction system can be at least 90%, while the sulfur content of the bottoms can be less than 300 wppm. Thus, the bottoms from the hydroprocessing reaction system can be suitable for use as a Group II, Group II+, or Group III lubricant base oil.

Other Embodiments

Additionally or alternately, the present invention can include one or more of the following embodiments.

Embodiment 1. A method of forming a dewaxing catalyst, the method comprising: impregnating a support comprising a zeolitic molecular sieve with a solution comprising a Group 6 metal salt, a Group 8-10 non-noble metal salt, and a dispersion agent, the dispersion agent comprising a compound having 2-10 carbon atoms and a carbon atom to oxygen atom ratio of about 0.6 to about 2.0; and drying the impregnated support at a temperature of about 80° C. to about 200° C. to form a dewaxing catalyst.

Embodiment 2. A dewaxing catalyst formed by the method comprising: impregnating a support comprising a zeolitic molecular sieve with a solution comprising a Group 6 metal salt, a Group 8-10 non-noble metal salt, and a dispersion agent, the dispersion agent comprising a compound having 2-10 carbon atoms and a carbon atom to oxygen atom ratio of about 0.6 to about 2.0; and drying the impregnated support at a temperature of about 80° C. to about 200° C. to form a dewaxing catalyst.

Embodiment 3. The method or dewaxing catalyst of any of the above embodiments, further comprising sulfiding the dried impregnated support under effective sulfiding conditions to form a sulfided dewaxing catalyst, the sulfiding optionally being performed without prior calcining of the dried impregnated support.

Embodiment 4. A method for treating a distillate boiling range feed, comprising: exposing a distillate boiling range feed to a dewaxing catalyst under effective hydroprocessing conditions, the dewaxing catalyst comprising a Group 6 metal sulfide and a Group 8-10 non-noble metal sulfide, the catalyst being formed by: impregnating a support comprising a zeolitic molecular sieve with an impregnation solution comprising a Group 6 metal salt, a Group 8-10 non-noble metal salt, and a dispersion agent, the dispersion agent comprising a compound having 2-10 carbon atoms and a carbon atom to oxygen atom ratio of about 0.6 to about 2.0; drying the impregnated support at a temperature of about 80° C. to about 200° C.; and sulfiding the dried impregnated support under effective sulfiding conditions.

Embodiment 5. The method of Embodiment 4, wherein the effective hydroprocessing conditions comprise at least one of effective hydrotreating conditions and effective catalytic dewaxing conditions.

Embodiment 6. The method of any of Embodiments 4-5, further comprising exposing the distillate boiling range feed to a hydrotreating catalyst.

Embodiment 7. The method of any of Embodiments 4-6, wherein the effective hydroprocessing conditions comprise a temperature of at least about 350° C., for example at least about 360° C.

Embodiment 8. The method of any of Embodiments 4-7, wherein the dried impregnated support is sulfided without prior calcining of the dried impregnated support.

Embodiment 9. The method or dewaxing catalyst of any of the above embodiments, wherein the zeolitic molecular sieve comprises a zeolite.

Embodiment 10. The method or dewaxing catalyst of any of the above embodiments, wherein the zeolitic molecular sieve comprises ZSM-48, ZSM-11, a molecular sieve having a 10-member ring as a largest pore channel, a molecular sieve having an MEL and an MRE framework structure, a molecular sieve having an MRE framework structure, or a combination thereof.

Embodiment 11. The method or dewaxing catalyst of any of the above embodiments, wherein the Group 8-10 non-noble metal salt comprises an Ni salt, a Co salt, or a combination thereof.

Embodiment 12. The method or dewaxing catalyst of any of the above embodiments, wherein the Group 6 metal salt comprises a Mo salt, a W salt, or a combination thereof.

Embodiment 13. The method or dewaxing catalyst of any of the above embodiments, wherein the dispersion agent comprises a glycol, a carboxylic acid, or a combination thereof, the dispersion agent optionally comprising citric acid and/or an organic acid having at least 5 carbon atoms.

Embodiment 14. The method or dewaxing catalyst of any of the above embodiments, wherein a molar ratio of dispersion agent to total metals in the solution is about 0.1 to about 5.0, for example about 0.1 to about 2.0, about 0.2 to about 2.0, about 0.3 to about 2.0, or about 0.3 to about 1.0; wherein a molar ratio of dispersion agent to Group 8-10 non-noble metal is about 0.5 to about 10, for example about 0.5 to about 5.0 or about 1.0 to about 5.0; or a combination thereof.

Embodiment 15. The method or dewaxing catalyst of any of the above embodiments, wherein impregnating the support comprising a zeolitic molecular sieve comprises impregnating a support comprising a bound zeolitic molecular sieve, the support optionally comprising an alumina binder.

Embodiment 16. The method or dewaxing catalyst of Embodiment 15, wherein the support comprises a binder having a surface area of about 150 m$^2$/g or less, for example about 130 m$^2$/g or less or about 100 m$^2$/g or less.

Embodiment 17. A catalyst composition made according to the method of any of Embodiments 1, 3, and 9-16.

EXAMPLES

In the following examples, the benefit of using a dispersion agent for impregnation of base metals on dewaxing catalysts is demonstrated using catalysts based on ZSM-48 and ZSM-11.

Example 1: Preparation of ZSM-11

A mixture was prepared from about 8.25 kg of water, about 1.54 kg of tetra-n-butylammonium bromide (~50% solution) as a structure directing agent or template, about 2.75 kg of Ultrasil™ silica, about 1.01 kg of aluminum sulfate solution (~47%), about 880 g of ~50% sodium hydroxide solution, and about 30 g of ZSM-11 seeds. The mixture had the following molar composition:

TABLE

Example 1

| Reactants | Molar ratio |
| --- | --- |
| $SiO_2:Al_2O_3$ | ~50.2 |
| $H_2O:SiO_2$ | ~13.9 |
| $OH^-:SiO_2$ | ~0.15 |
| $Na^+/SiO_2$ | ~0.26 |
| template/$SiO_2$ | ~0.06 |

Figure 9:
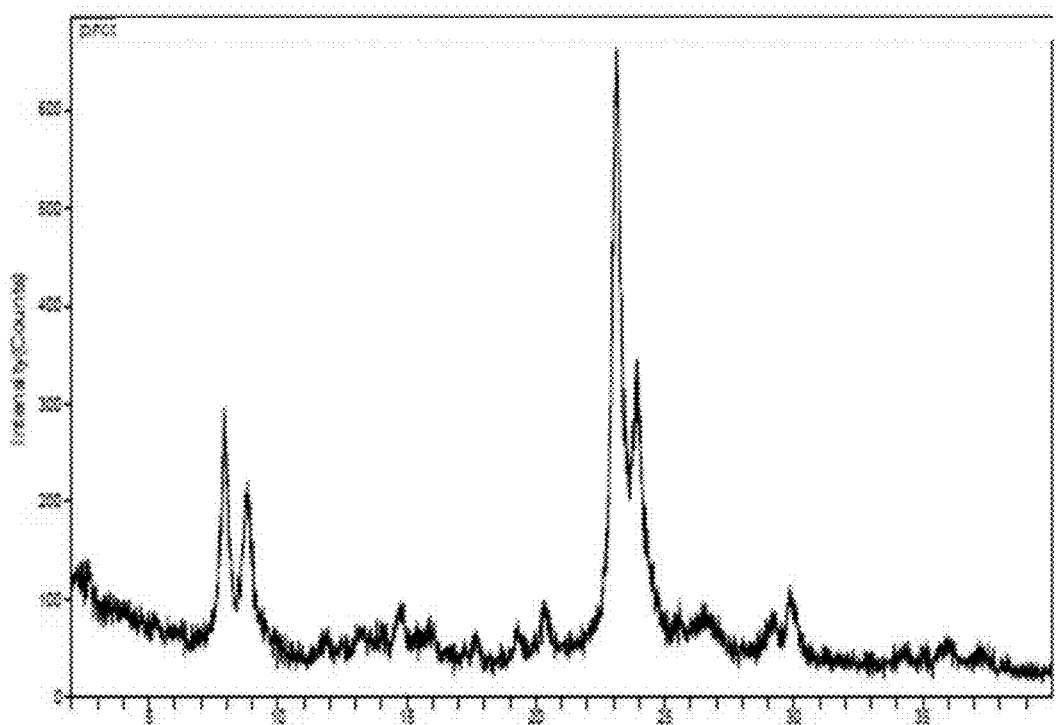
FIG. 9 shows an X-ray diffraction plot of ZSM-11 crystals.
Figure 10:
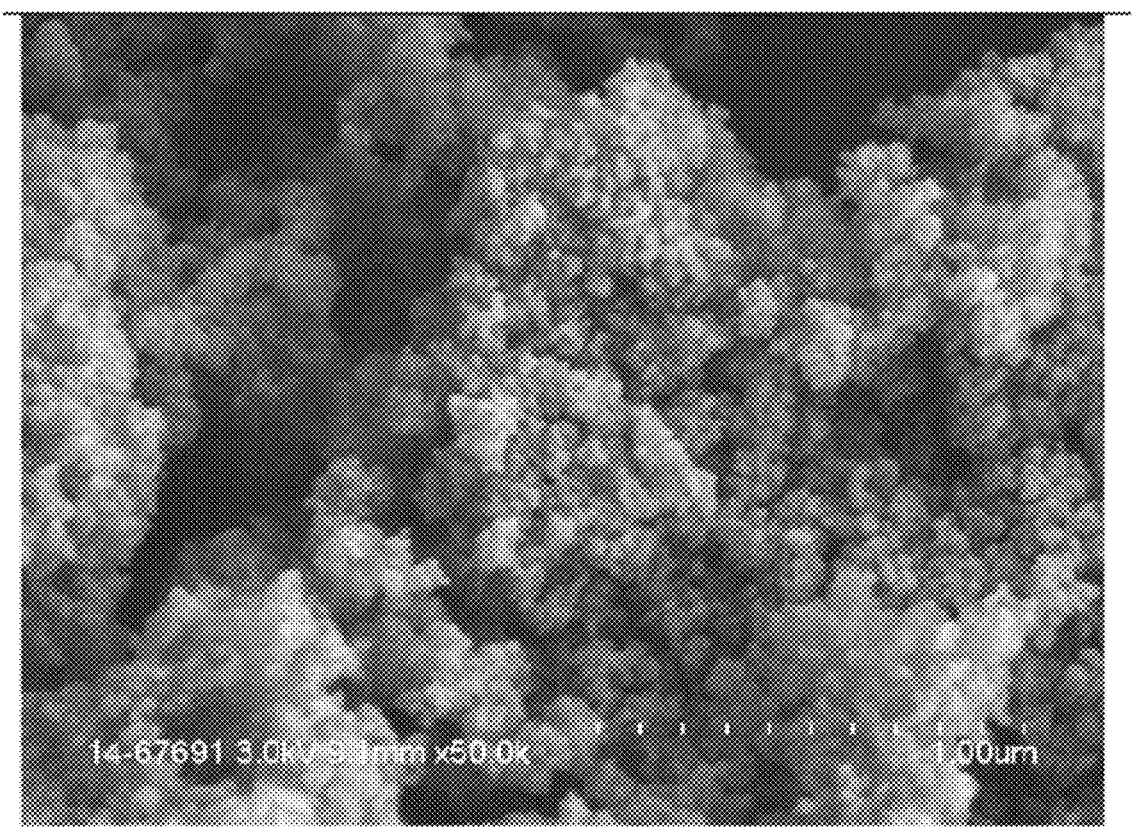
FIG. 10 shows a scanning electron microscopy micrograph of ZSM-11 crystals.

The mixture was reacted at about 250° F. (~121° C.) in a ~5-gal autoclave with stirring at about 350 RPM for ~120 hours. The product was filtered, washed with deionized (DI) water and dried at about 250° F. (~121° C.). The XRD pattern of the as-synthesized material appeared to show typical pure phase ZSM-11 topology, as shown in FIG. 9. The SEM of the as-synthesized material appeared to show morphology of agglomerates composed of small crystallites with size of <0.05 micron, as shown in FIG. 10. The as-synthesized crystals were converted into the hydrogen form by three ion exchanges with ammonium nitrate solution at room temperature (~20-25° C.), followed by drying at 250° F. (~121° C.) and calcination at about 1000° F. (~538° C.) for ~6 hours. The resulting MA-ZSM-11 crystals had a $SiO_2/Al_2O_3$ molar ratio of ~45, a total surface area (total SA=micropore SA+mesopore SA) of ~481 $m^2/g$ (~364 $m^2/g$ micropore+~117 $m^2/g$ mesopore), hexane sorption of about 96.9 mg/g, and an Alpha value of about 750.

Example 2: Extrusion of Small, Medium Activity ZSM-11 Crystals with Alumina Binders About 65 parts (basis: calcined ~538° C.) of ZSM-11 crystal with silica/alumina molar ratio of ~45/1 (Example 1) were mixed with about 35 parts of pseudoboehmite alumina (basis: calcined ~538° C.) in a Simpson muller. Sufficient water was added to produce an extrudable paste on a ~2" Bonnot extruder. The mix of ZSM-11, pseudoboehmite alumina, and water containing paste was extruded and dried in a hotpack oven at ~121° C. overnight (~8-16 hours). The dried extrudate was calcined in nitrogen at ~538° C. to decompose and remove the organic template. The $N_2$ calcined extrudate was humidified with saturated air and exchanged with ~1N ammonium nitrate to remove sodium (spec: <500 ppm Na). After ammonium exchange, the extrudate was washed with deionized water to remove residual nitrate ions prior to drying. The ammonium exchanged extrudate was dried at ~121° C. overnight and calcined in air at ~538° C. Several extrusions were made with varying zeolite/binder ratios. Catalyst 2a corresponded to a ~65/~35 ratio of zeolite to alumina described above; catalyst 2b corresponded to a ~50/~50 ratio of zeolite to alumina; and Catalyst 2c corresponded to a ~35/~65 ratio. The Alpha and BET $N_2$ porosity data for these catalysts are summarized in Table 2 below.

TABLE 2

Extruded ZSM-11 catalyst particle properties

| | Alpha value | n-hexane uptake (mg/g) | Micropore surf. area ($m^2/g$) | External surf. area ($m^2/g$) | Pore vol. (cc/g) | Median pore size (nm) |
| --- | --- | --- | --- | --- | --- | --- |
| 2a | ~440 | ~73.9 | ~199 | ~220 | ~0.71 | ~9.7 |
| 2b | ~390 | ~64.8 | ~152 | ~244 | ~0.70 | ~8.4 |
| 2c | ~290 | ~55.1 | ~81.5 | ~294 | ~0.75 | ~8.3 |

Example 3: Preparation of Base Metal ZSM-11 and ZSM-48 Catalysts with Dispersion Agents Extrudates similar to those made in Example 2 were used as supports for base metals. The extrudates included either a higher surface area alumina (Versal™ 300) or a lower surface area alumina (Catapal™ 200 or Catapal™ D) as a binder. The absorption capacity of the extrudates was estimated using deionized water. NiMo and NiW impregnations were performed on extrudates from both Examples 2a and 2b. The Ni, Mo, and W precursor compounds used in the catalyst preparations were nickel carbonate hydroxide tetrahydrate, ammonium heptamolybdate tetrahydrate, and ammonium metatungstate hydrate, respectively. The dispersion aid used in the impregnations was chosen as either citric acid, nitrilotriacetic acid (NTA), gluconic acid (GA), or ethylene glycol. The volume of the impregnation solution was targeted as ~95% of the absorption capacity of the extrudates. To avoid damaging the extrudates during impregnation, the extrudates were humidified with air bubbling through a water bath at room temperature for ~16 hours.

As an example, for Example 3a, the absorption capacity of the extrudate was measured as ~0.60 ml/g. About 5.38 g of citric acid was dissolved in ~8.0 g of deionized water. About 1.65 g of nickel carbonate hydroxide tetrahydrate was slowly added into the citric acid solution, followed by the addition of ~6.26 g of ammonium heptamolybdate tetrahydrate. These amounts yielded a solution with Ni:Mo molar ratio of ~0.39 and citric acid/Ni molar ratio of ~2. The total solution volume was adjusted with deionized water to give a volume of ~11.4 mL, and the solution was impregnated onto ~20.0 g of catalyst from Example 2a. After impregnation the catalyst was dried in air at ~121° C. for ~16 hours. It is noted that a subsequent calcination was not performed after drying. Table 3 lists the ZSM-11 catalysts prepared with dispersion aids. Similarly, ZSM-48 containing catalysts were prepared and impregnated with base metals using the dispersion aids. Table 3 also lists the ZSM-48 catalysts demonstrated and tested in the course of this work.

In Table 3, "V300" was used to refer to the higher surface area alumina binder, while "C200" was used to refer to the lower surface area binder. For catalyst 3x, the catalyst was both dried at ~121° C. and calcined at a temperature above ~350° C. after impregnation with a solution containing an Ni salt, W salt, and acetate precursor.

TABLE 3

Catalyst Compositions

3a - 3.4 wt % Ni/14 wt % Mo/citric acid/(65/35) ZSM-11 (46:1 SiO$_2$:Al$_2$O$_3$)/V300
3b - 3.4 wt % Ni/14 wt % Mo/citric acid/(50/50) ZSM-11 (46:1 SiO$_2$:Al$_2$O$_3$)/V300
3c - 3.4 wt % Ni/14 wt % Mo/citric acid/(35/65) ZSM-11 (46:1 SiO$_2$:Al$_2$O$_3$)/V300
3d - 2.9 wt % Ni/8.8 wt % Mo/citric acid/(65/35) ZSM-11 (46:1 SiO$_2$:Al$_2$O$_3$)/V300
3e - 3.3 wt % Ni/5.7 wt % Mo/citric acid/(65/35) ZSM-11 (46:1 SiO$_2$:Al$_2$O$_3$)/V300
3g - 3.3 wt % Ni/5.7 wt % Mo/citric acid/(65/35) ZSM-11 (46:1 SiO$_2$:Al$_2$O$_3$)/C200
3h - 3.3 wt % Ni/5.7 wt % Mo/nitrilotriacetic acid/(65/35) ZSM-11 (46:1 SiO$_2$:Al$_2$O$_3$)/V300
3i - 3.2 wt % Ni/10.9 wt % W/citric acid/(65/35) ZSM-11 (46:1 SiO$_2$:Al$_2$O$_3$)/C200
3j - 3.2 wt % Ni/10.9 wt % W/citric acid/(65/35) ZSM-11 (46:1 SiO$_2$:Al$_2$O$_3$)/V300
3k - 3.4 wt % Ni/14 wt % Mo/citric acid/(65/35) ZSM-48 (70:1 SiO$_2$:Al$_2$O$_3$)/C200
3l - 3.3 wt % Ni/5.7 wt % Mo/citric acid/(65/35) ZSM-48 (70:1 SiO$_2$:Al$_2$O$_3$)/C200
3q - 3 wt % Ni/15.5 wt % Mo/carbonate-citric acid/(65/35) ZSM-48 (70:1 SiO$_2$:Al$_2$O$_3$)/C200
3x - 3 wt % Ni/15.5 wt % W/acetate (calcined)/(65/35) ZSM-48 (70:1 SiO$_2$:Al$_2$O$_3$)/C200
3y - 3 wt % Ni/15.5 wt % W/ethylene glycol/(65/35) ZSM-48 (70:1 SiO$_2$:Al$_2$O$_3$)/C200
3z - 3 wt % Ni/15.5 wt % W/citric acid/(65/35) ZSM-48 (70:1 SiO$_2$:Al$_2$O$_3$)/C200

Example 4: Preparation of Base Metal Dewaxing Catalyst by Sequential Incipient Wetness Impregnation (Comparative)

ZSM-48 Catalyst 4a: ~20 wt % W and ~3 wt % Ni were loaded onto a ~65/~35 steamed (~3 hours @ ~370° C.) ZSM-48 (~70:1 SiO$_2$:Al$_2$O$_3$)/Catapal™ 200 extrudate using sequential incipient wetness impregnations. The W was impregnated first using ammonium metatungstate hydrate. Following this impregnation, the catalyst was dried at ~121° C. followed by calcination in air at ~482° C. for ~1 hour. After calcination of the W, the Ni impregnation was performed using nickel nitrate hexahydrate. Following the impregnation of the Ni, the catalyst was dried at ~121° C. followed by calcination in air at ~482° C. for ~1 hour. The final catalyst nominally contained ~15.4 wt % W and ~2.9 wt % Ni.

ZSM-11 Catalyst 4b: ~20 wt % W and ~3 wt % Ni were loaded onto a ~65/~35 calcined ZSM-11 (~46:1 SiO$_2$:Al$_2$O$_3$)/Catapal™ 200 extrudates using sequential incipient wetness impregnations. The W was impregnated first using ammonium metatungstate hydrate. Following this impregnation, the catalyst was dried at ~121° C. followed by calcination in air at ~482° C. for ~1 hour. After calcination of the W, the Ni impregnation was performed using nickel nitrate hexahydrate. Following the impregnation of the Ni, the catalyst was dried at ~121° C. followed by calcination in air at ~482° C. for ~1 hour. The final catalyst nominally contained ~15.4 wt % W and ~2.9 wt % Ni.

Example 5: Preparation of Base Metal Catalysts with Dispersion Agents Supported on Al$_2$O$_3$ (Comparative)

Using impregnation methods described in Example 3, two base metal catalysts were prepared by impregnating a solution of base metal precursors, dispersion agent, and water onto extrudates composed of ~100% Al$_2$O$_3$. The alumina extrudates corresponded to extrudates suitable for use as a catalyst support for a hydrotreating catalyst. These two catalysts are summarized in Table 4.

TABLE 4

Impregnation with dispersion agent on amorphous alumina

5a - 3.4 wt % Ni/14 wt % Mo/citric acid/Al$_2$O$_3$
5b - 2.9 wt % Ni/8.8 wt % Mo/citric acid/Al$_2$O$_3$

Example 6: Distillate Dewaxing Evaluation of Base Metal Dewaxing Catalysts

The catalysts of examples 3, 4, and 5 were evaluated for sour service hydrotreating/dewaxing (hydroisomerization) of a diesel boiling range feed at ~2 hr$^{-1}$ LHSV, ~1000 psig, ~2250 SCFB hydrogen treat rate, and at temperatures between ~338° C. and ~393° C. The diesel feed used in this study was a clean (ULSD) diesel product, the properties of which are summarized in Table 5, spiked with dimethyl disulfide (DMDS) and tributylamine (TBA) to obtain atomic sulfur and nitrogen concentrations of ~1.5 wt % and ~500 ppm, respectively. Feed spiking was performed to generate H$_2$S and NH$_3$ to simulate the sour environment of a hydrotreater to allow for observation of dewaxing performance in a sour environment. The catalysts were sized and loaded into the reactor as ~14/20 mesh particles. The reactor was placed in a sand bath to ensure isothermal operation. After loading the catalyst were dried down and sulfided as follows: The catalyst was dried for ~2 hours under flowing N$_2$ at ~110° C. and ~600 psig, followed by a ~2 hour hold under H$_2$ at ~110° C. and ~600 psig. Following this dry down, catalyst wetting was performed at ~110° C. and ~1000 psig with a light gas oil and ~2000 SCFB H$_2$, followed by heating the reactor up to ~204° C. at which point feed was switched to a spiked light gas oil flowing at ~2.0 hr$^{-1}$ LHSV containing ~2.5 wt % S (spiking performed with DMDS to reach achieved S level) while maintaining H$_2$ flow at ~2250 SCFB. After introducing the spiked light gas oil, the reactor was heated to ~250° C. at a ramp rate of ~28° C./hr under the same liquid and gas flow rates and held for a minimum of 8 hours before ramping to ~321° C. at ~28° C./hr and performing a final hold of ~5 hours. After this final hold at ~321° C. was complete, the spiked diesel feed was introduced to the reactor, and the reactor temperature was increased to the first experimental condition.

TABLE 5

| | |
|---|---|
| 1% off (wt % D2887) | 140 (° C.) |
| 5% off | 183 |
| 10% off | 204 |
| 20% off | 231 |
| 30% off | 253 |
| 40% off | 274 |
| 50% off | 287 |
| 60% off | 303 |
| 70% off | 320 |
| 80% off | 340 |
| 90% off | 362 |

TABLE 5-continued

| | |
|---|---|
| 95% off | 374 |
| 99% off | 395 |
| API Gravity | 32.5 |
| Sulfur (wppm) | 10 |
| Nitrogen (wppm) | 0.2 |
| Cloud point (D5573) | −4.9° C. |

The dewaxing performance of the catalysts was evaluated by plotting cloud point reduction versus bed temperature and product yields versus cloud point reduction. Cloud point reduction is defined as the difference between feed cloud point and product cloud point. Feed and product cloud points were measured using ASTM D5773. Product cloud points were measured on the total liquid product (TLP) from the reactor. Product yields were calculated by closing material balances and using the simulated distillation (ASTM D2887) results of feed and product to determine yields. The diesel fraction of the feed and product was defined as the fraction boiling between ~177° C. and ~371° C.

In FIGS. 1-5, the solid line shows the temperature profile (right axis) used during the processing of the diesel feed. The symbols show the cloud point reduction (left axis) for the diesel boiling range product relative to the feed.

FIG. 1 shows a comparison of catalysts 3x, 3y, and 3z with two types of reference catalysts. One reference catalyst corresponds to a co-impregnated catalyst with metal loadings similar to 3x, 3y, and 3z, but made without a dispersion agent. The other reference catalyst corresponds to catalyst 4a, a sequentially impregnated catalyst with metal loading similar to catalysts 3x, 3y, and 3z. As shown in FIG. 1, catalysts 3y and 3z made with a dispersion agent and then dried but not calcined showed a ~15% to ~45% improvement in cloud point reduction relative to the reference catalysts. This improvement can be more evident for temperatures greater than 350° C., or greater than 360° C. Catalyst 3x, which included a dispersion agent but was calcined prior to sulfidation, exhibited a smaller improvement in cloud point reduction.

Figure 2:
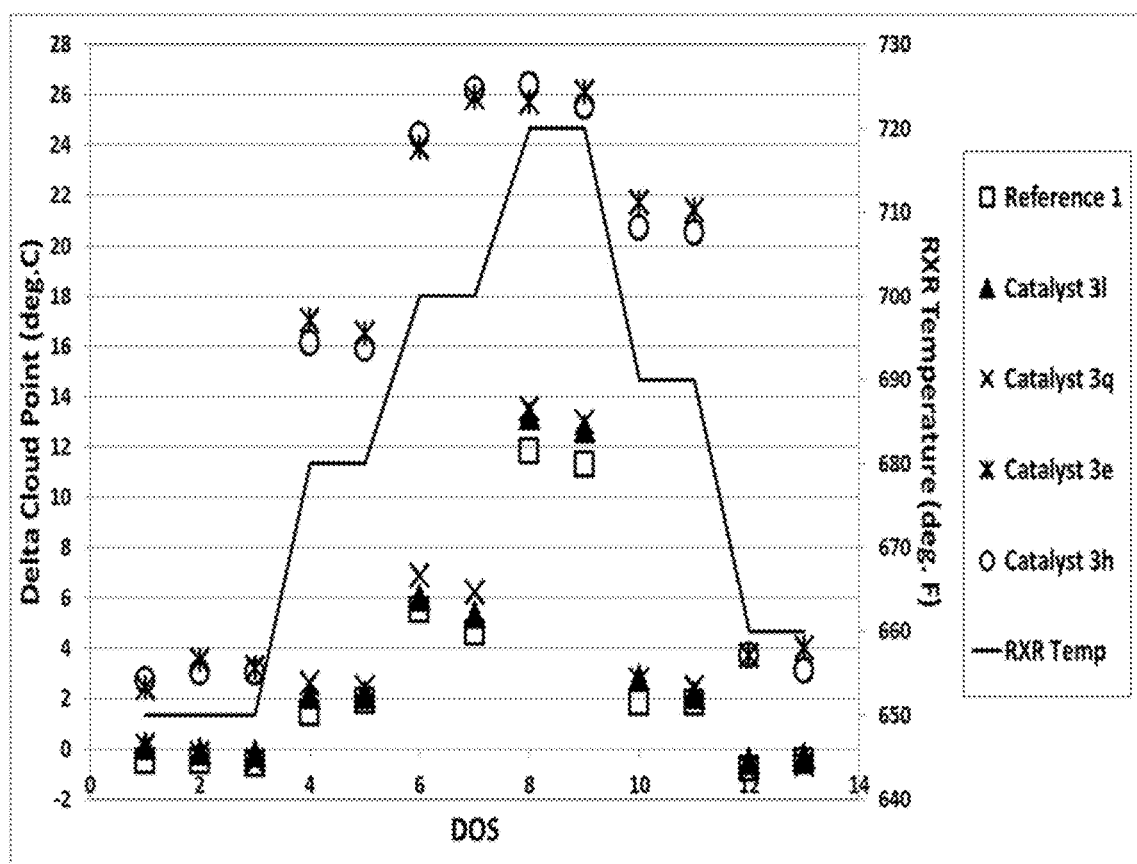
FIG. 2 shows results from processing a distillate feed over a variety of dewaxing catalysts.

FIG. 2 shows examples of cloud point reduction for both ZSM-11 and ZSM-48 catalysts. The co-impregnated reference catalyst shown in FIG. 1 is included in FIG. 2. ZSM-48 catalysts corresponding to catalysts 3l and 3q are shown, along with ZSM-11 catalysts corresponding to catalysts 3e and 3h. In FIG. 2, the ZSM-11 catalysts appear to show additional reduction in cloud point, as compared to ZSM-48 catalysts having similar metal loadings prepared with dispersion agents. The improvements range from an about +3° C. delta cloud improvement at the start-of-run temperature (about 343° C.) up to an about +14° C. delta cloud improvement at the highest temperature (about 380° C.).

Figure 3:
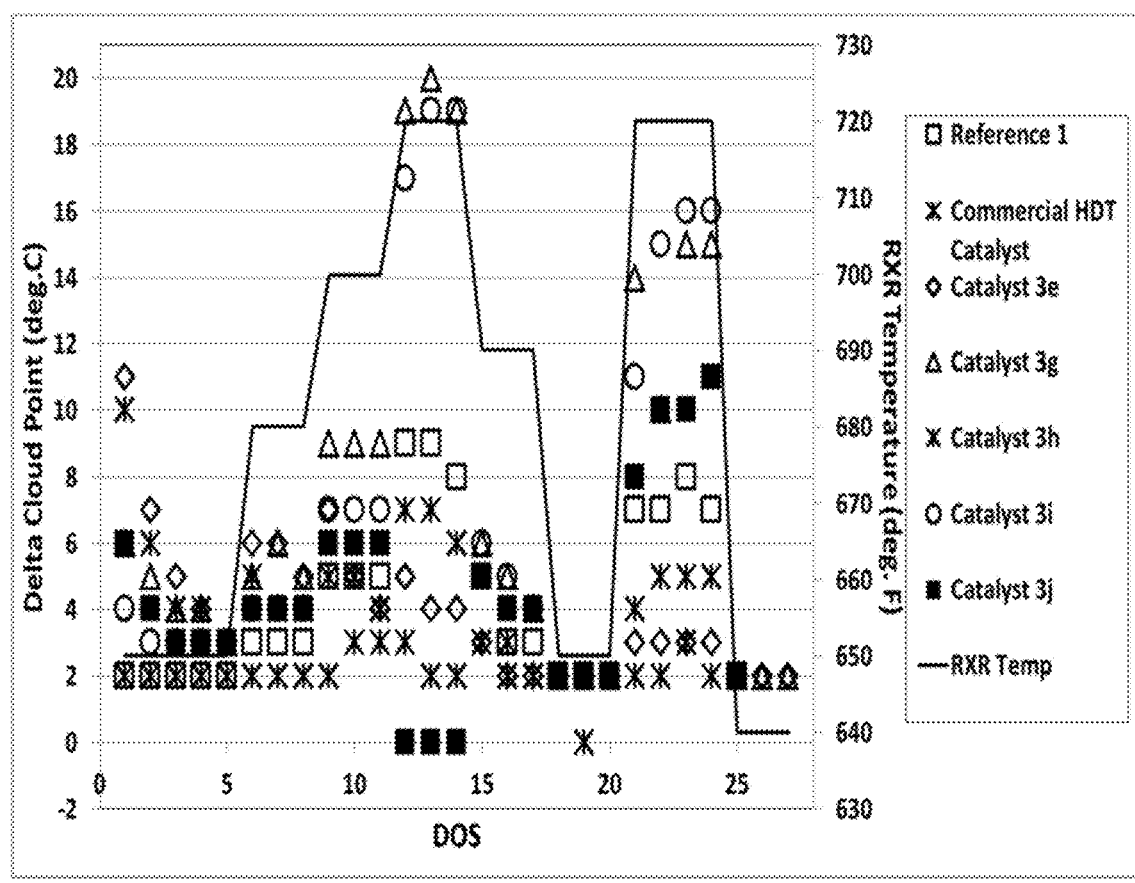
FIG. 3 shows results from processing a distillate feed over a variety of dewaxing catalysts.

FIG. 3 shows a comparison between a commercially available NiMo hydrotreating catalyst and various ZSM-11 catalysts with either a low surface area binder (3g, 3i) or a high surface area binder (3e, 3h, 3j). The same ZSM-48 reference catalyst from FIGS. 1 and 2 is also shown. As shown in FIG. 3, the commercially available hydrotreating catalyst showed essentially no cloud point reduction irrespective of temperature. For the ZSM-11 catalysts, some cloud point reduction occurred for all catalysts, with larger cloud point reductions being observed for catalysts having a low surface area binder (3g and 3i).

Figure 4:
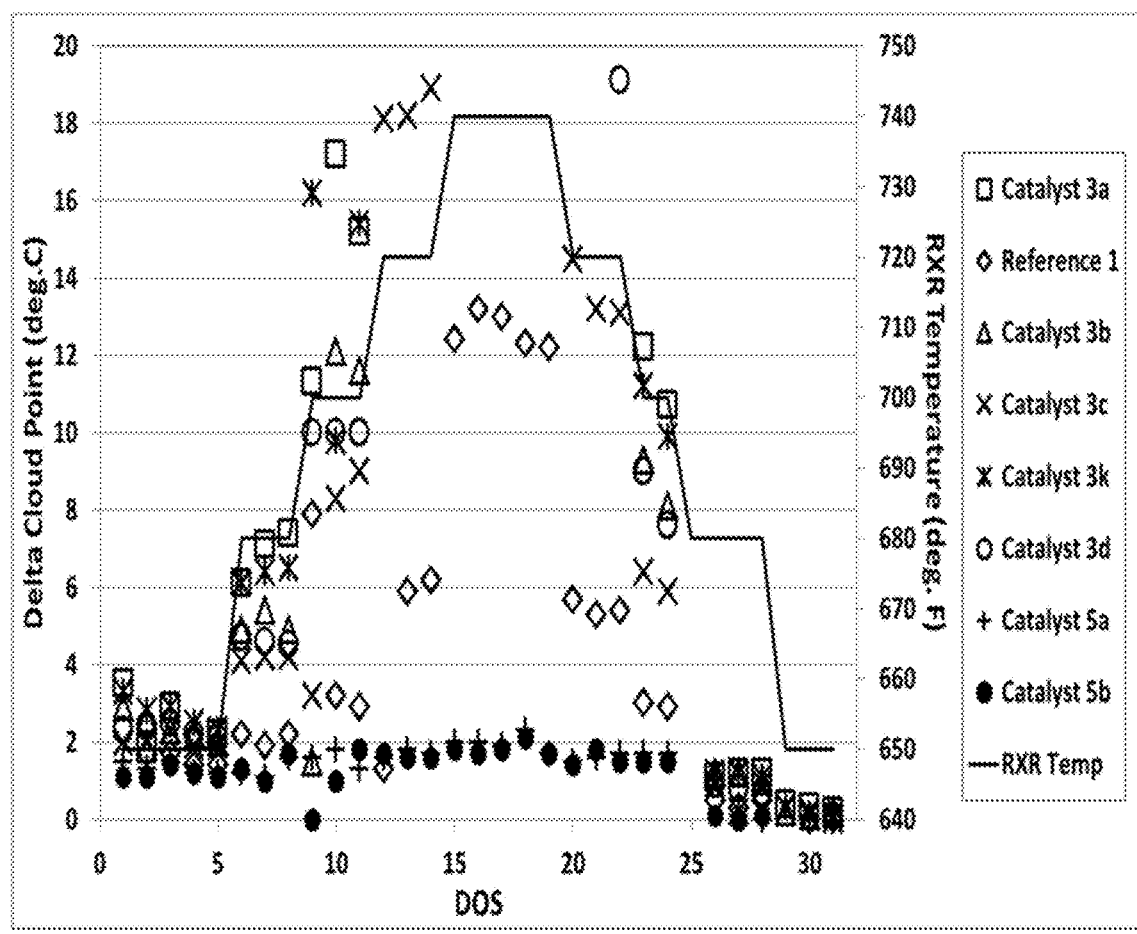
FIG. 4 shows results from processing a distillate feed over a variety of dewaxing catalysts.
Figure 5:
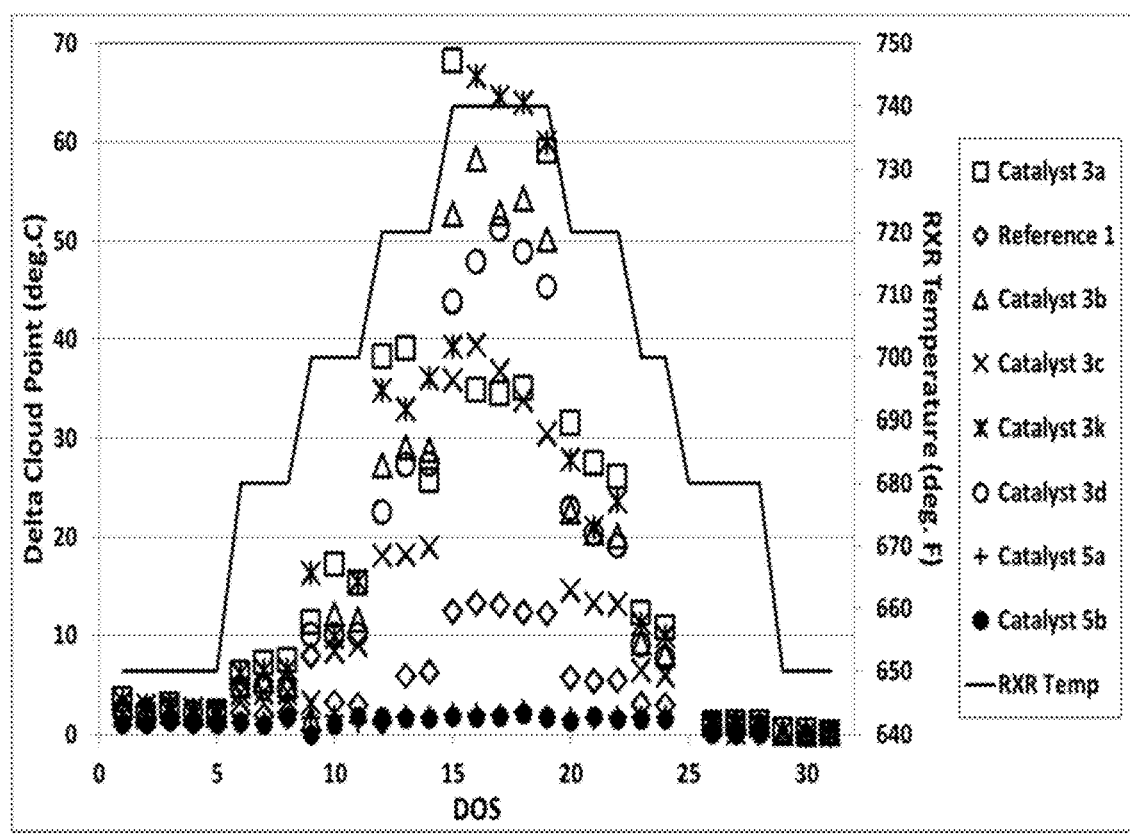
FIG. 5 shows results from processing a distillate feed over a variety of dewaxing catalysts.

FIGS. 4 and 5 show cloud point reduction data for various ZSM-11 catalysts. FIG. 4 is a larger scale view of the same data shown in FIG. 5. Catalysts 3a, 3b, and 3c correspond to a series of ZSM-11 catalysts with increasing zeolite loading. Catalysts 3k and 3d correspond to catalysts with metal loadings similar to comparative catalysts 5a and 5b (metals on amorphous alumina substrate). The ZSM-48 reference catalyst shown in FIGS. 1-3 is also shown. A comparison of Catalysts 3a, 3b, and 3c appears to show increasing cloud point reduction with increasing zeolite content. Catalysts 3k and 3d both show improvement in cloud point reduction, relative to comparative catalysts 5a and 5b. It is noted that catalyst 3k with a low surface area binder appears to provide the largest improvement in cloud point reduction across the reaction temperatures shown in FIGS. 4 and 5.

Example 7: Distillate Hydrotreating Evaluation of Base Metal Catalysts

The catalysts used to generate the cloud point data in FIG. 3 were sized and loaded into a reactor as ~14/20 mesh particles. The reactor was placed in a sand bath to approximate isothermal operation. A full range diesel feed with organic S and N species was selected as the feed, the properties of which are shown in Table 6. After loading, the catalysts were dried for ~2 hours under flowing $N_2$ at ~110° C. and ~600 psig, followed by a ~2 hour hold under $H_2$ at ~110° C. and ~600 psig. Following drying, the catalyst wetting was performed at ~110° C. and ~1000 psig with a light gas oil and ~2250 SCFB Hz, followed by heating the reactor up to ~204° C. at which point feed was switched to a spiked light gas oil flowing at ~2.0 LHSV containing ~2.5 wt % S (spiking performed with DMDS to reach achieved S level) while maintaining $H_2$ flow at ~2250 SCFB. After introducing the spiked light gas oil, the reactor was heated to ~250° C. at a ramp rate of ~28° C./hr under the same liquid and gas flow rates and held for a minimum of 8 hours before ramping to ~321° C. at ~28° C./hr and performing a final hold of ~5 hours. After this final hold at ~321° C. was complete, the spiked diesel feed was introduced to the reactor and the reactor temperature was increased to the first experimental condition at ~343° C.

TABLE 6

| | |
|---|---|
| 1% off (wt % D2887) | 168 (° C.) |
| 5% off | 225 |
| 10% off | 252 |
| 20% off | 286 |
| 30% off | 314 |
| 40% off | 338 |
| 50% off | 357 |
| 60% off | 370 |
| 70% off | 381 |
| 80% off | 394 |
| 90% off | 412 |
| 95% off | 426 |
| 99% off | 449 |
| API Gravity | 29.0 |
| Sulfur (wt %) | 1.01 |
| Nitrogen (wppm) | 460 |
| Cloud point (D5573) | 13° C. |

Figure 6:
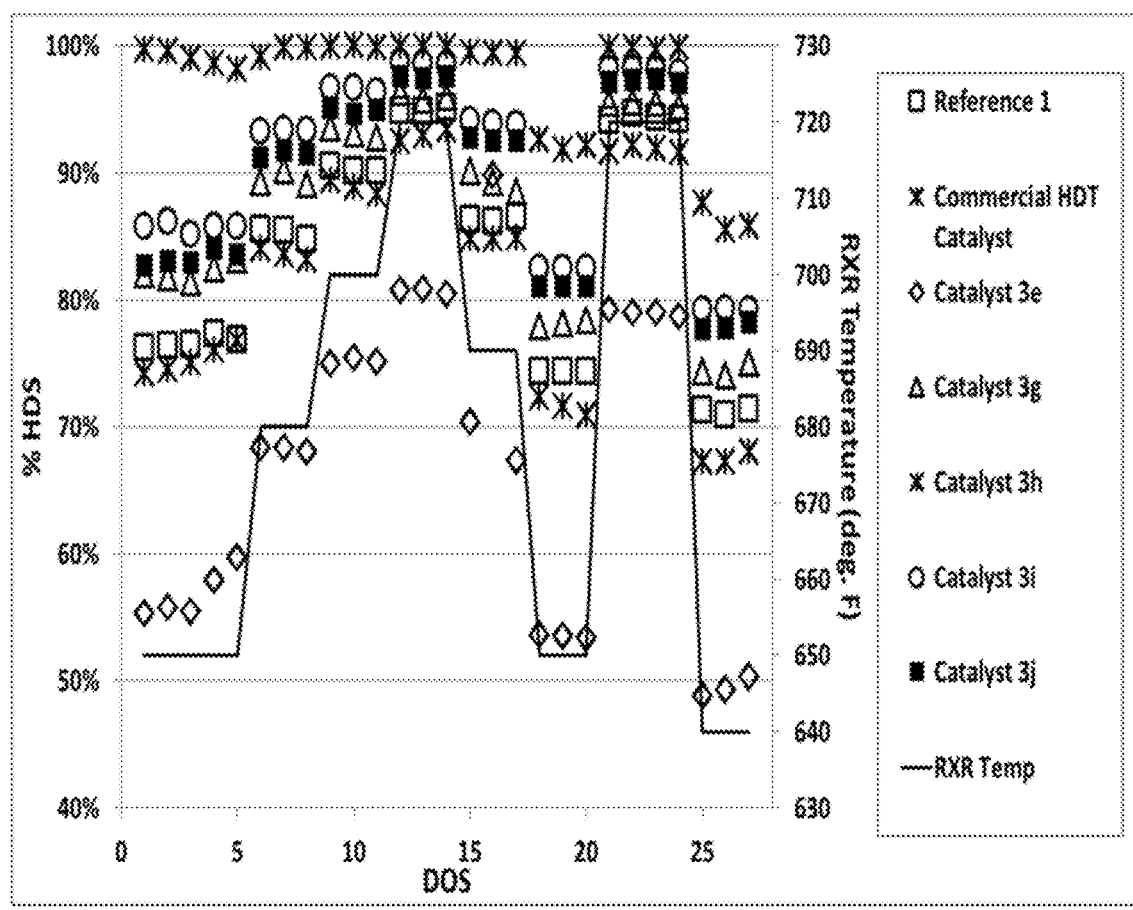
FIG. 6 shows results from processing a distillate feed over a variety of dewaxing catalysts.
Figure 7:
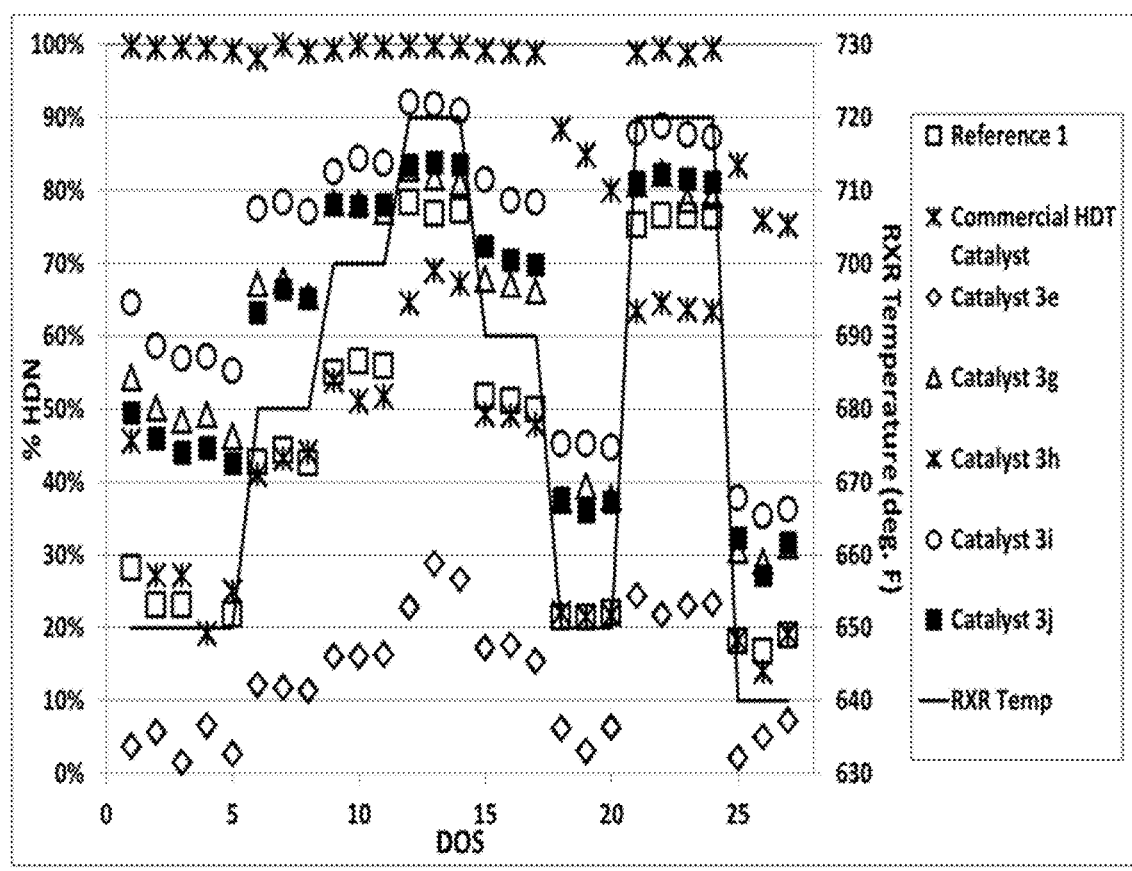
FIG. 7 shows results from processing a distillate feed over a variety of dewaxing catalysts.

The hydrotreating functions of the base metal dewaxing catalysts were evaluated by calculating the percentage of organic sulfur and nitrogen removed by the catalyst. Organic sulfur and nitrogen measurements were made by stripping the TLP of $H_2S$ and $NH_3$, and then the organic sulfur and nitrogen concentrations were measured. These are referred to as % HDS and % HDN, respectively. The hydrodesulfurization (HDS) results are shown in FIG. 6, while the hydrodenitrogenation (HDN) results are shown in FIG. 7. The results in FIGS. 6 and 7 show that the ZSM-11 catalysts with NiW metals loadings (3i, 3j) had higher HDS and HDN activities than the catalysts with NiMo metal loadings (3e, 3g, 3h). The catalysts including the lower surface area, higher density binder (3g, 3i) also showed relatively higher HDS and HDN activity than the catalysts with the higher surface area binder (3e, 3h, 3j).

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A method of forming a dewaxing catalyst, the method comprising:
    impregnating a support comprising about 30 wt % to about 100 wt % of a zeolitic molecular sieve, based on the total weight of the support, with a solution comprising a Group 6 metal salt, a Group 8-10 non-noble metal salt, and a dispersion agent, the dispersion agent comprising a compound having 2-10 carbon atoms and a carbon atom to oxygen atom ratio of about 0.6 to about 2.0; and
    drying the impregnated support at a temperature of about 80° C. to about 200° C. to form a dewaxing catalyst.

2. The method of claim 1, wherein the zeolitic molecular sieve comprises a zeolite.

3. The method of claim 1, wherein the zeolitic molecular sieve comprises ZSM-48, ZSM-11, a molecular sieve having a 10-member ring as a largest pore channel, or a combination thereof.

4. The method of claim 1, wherein the Group 8-10 non-noble metal salt comprises an Ni salt, a Co salt, or a combination thereof; and wherein the Group 6 metal salt comprises a Mo salt, a W salt, or a combination thereof.

5. The method of claim 1, wherein a molar ratio of dispersion agent to total metals in the solution is about 0.1 to about 5.0; or wherein a molar ratio of dispersion agent to Group 8-10 non-noble metal is 0.5 to 10; or a combination thereof.

6. The method of claim 1, further comprising sulfiding the dried impregnated support under effective sulfiding conditions to form a sulfided dewaxing catalyst, the sulfiding optionally being performed without prior calcining of the dried impregnated support.

7. The method of claim 1, wherein the dispersion agent comprises a glycol, a carboxylic acid, or a combination thereof.

8. The method of claim 1, wherein impregnating the support comprising a zeolitic molecular sieve comprises impregnating a support comprising a bound zeolitic molecular sieve, the support optionally comprising an alumina binder.

9. The method of claim 8, wherein the support comprises a binder having a surface area of about 150 $m^2/g$ or less.

10. The method of claim 1, wherein the dispersion agent comprises citric acid, an organic acid having at least 5 carbon atoms, or a combination thereof.

* * * * *